United States Patent [19]
Taira et al.

[11] Patent Number: 5,642,346
[45] Date of Patent: Jun. 24, 1997

[54] RECORDING MEDIUM AND REPRODUCING APPARATUS THEREOF

[75] Inventors: Kazuhiko Taira; Hideki Mimura; Shinichi Kikuchi, all of Yokohama; Tetsuya Kitamura, Komae, all of Japan

[73] Assignee: Kabushiki Kaisha Toshiba, Kawasaki, Japan

[21] Appl. No.: 708,751

[22] Filed: Sep. 5, 1996

Related U.S. Application Data

[62] Division of Ser. No. 421,743, Apr. 13, 1995.

[30] Foreign Application Priority Data

| Apr. 14, 1994 | [JP] | Japan | 6-076194 |
| Mar. 15, 1995 | [JP] | Japan | 7-055970 |

[51] Int. Cl.$^6$ .................................................. G11B 7/00
[52] U.S. Cl. .................................................. 369/275.3
[58] Field of Search .......................... 369/275.1, 275.2, 369/275.3, 275.4

[56] References Cited

U.S. PATENT DOCUMENTS

| 4,862,439 | 8/1989 | Ando . |
| 5,138,925 | 8/1992 | Koguchi . |
| 5,280,572 | 1/1994 | Case . |
| 5,367,510 | 11/1994 | Ando . |
| 5,434,678 | 7/1995 | Abecassis . |
| 5,469,370 | 11/1995 | Ostrover . |
| 5,473,584 | 12/1995 | Oshima ................................ 369/32 |
| 5,521,900 | 5/1996 | Ando . |
| 5,546,365 | 8/1996 | Roth . |
| 5,546,368 | 8/1996 | Lee . |

FOREIGN PATENT DOCUMENTS

| 0 325 325 | 7/1989 | European Pat. Off. . |
| 0 459 157 | 12/1991 | European Pat. Off. . |
| 0 459 531 | 12/1991 | European Pat. Off. . |
| 0 510 871 | 10/1992 | European Pat. Off. . |
| 0 521 487 | 1/1993 | European Pat. Off. . |
| 0 542 377 | 5/1993 | European Pat. Off. . |
| 0 570 203 | 11/1993 | European Pat. Off. . |
| 0 644 692 | 3/1995 | European Pat. Off. . |
| 0 676 894 | 10/1995 | European Pat. Off. . |
| 0 691 651 | 1/1996 | European Pat. Off. . |
| 0 691 652 | 1/1996 | European Pat. Off. . |
| 0 714 098 | 6/1996 | European Pat. Off. . |
| 0 724 264 | 7/1996 | European Pat. Off. . |
| 2-287990 | 11/1990 | Japan . |

(List continued on next page.)

OTHER PUBLICATIONS

Patent Abstracts of Japan, vol. 12, No. 494 (P-805) Dec. 1988 re JP-A-63 204552.
Patent Abstracts of Japan, vol. 17, No. 596 (P-1636) Oct. 1993 re JP-A-05 174389.
"Information processing—Volume and file structure of CD-ROM for information interchange," ISO 9660 (1988).

*Primary Examiner*—Nabil Hindi
*Attorney, Agent, or Firm*—Cushman Darby & Cushman IP Group of Pillsbury Madison & Sutro LLP

[57] ABSTRACT

A table of a management region on the disc, contains a disc identifier that represents the type of the data recording format of the disc, a number-of-disc-sides identifier that represents whether the disc is a single-sided disc or a double-sided disc, and a disc side identifier that represents whether the reproducing disc is side A or side B of a double-sided disc. A disc identifier that represents the type of the data recording format of the file is recorded in a file (n) table including management information of the file. A reproducing apparatus reads the disc identifiers from the table and the file (n) table and determines whether or not the disc and the file are reproducible. In addition, the reproducing apparatus reads the number-of-disc-sides identifier from the table and determines whether or not the disc is a double-sided disc or a single-sided disc. When the disc is a double-sided disc, the reproducing apparatus determines whether the reproducing side is side A or side B.

3 Claims, 34 Drawing Sheets

FOREIGN PATENT DOCUMENTS

| | | |
|---|---|---|
| 5-46624 | 2/1993 | Japan . |
| 5-67335 | 3/1993 | Japan . |
| 5-89643 | 4/1993 | Japan . |
| 6-28778 | 2/1994 | Japan . |
| 6-60547 | 3/1994 | Japan . |
| 94/07332 | 3/1994 | WIPO . |
| 95/12179 | 5/1995 | WIPO . |
| 96/16406 | 5/1996 | WIPO . |

FIG. 2

| BP | COLUMN NAME | DATA TYPE |
|---|---|---|
| 1 | TYPE OF VOLUME DESCRIPTOR | NUMERIC, (01H) |
| 2~6 | STANDARD DESCRIPTOR | CD001 |
| 7 | REVISION NUMBER OF VOLUME DESCRIPTOR | NUMERIC, (01H) |
| 8 | NOT USED | (00H), BYTE |
| 9~40 | SYSTEM IDENTIFIER | CHARACTER |
| 41~72 | VOLUME IDENTIFIER | CHARACTER |
| 73~80 | NOT USED | (00H), BYTE |
| 81~88 | SIZE OF VOLUME SPACE | NUMERIC |
| 89~120 | NOT USED | NUMERIC |
| 121~124 | SIZE OF VOLUME GROUP | NUMERIC |
| 125~128 | VOLUME SEQUENCE NUMBER | NUMERIC |
| 129~132 | LENGTH OF LOGICAL BLOCK | NUMERIC |
| 133~140 | SIZE OF PATH TABLE | NUMERIC |
| 141~144 | POSITON OF L TYPE PATH TABLE | NUMERIC |
| 145~148 | POSITON OF ANY L TYPE PATH TABLE | NUMERIC |
| 149~152 | POSITON OF M TYPE PATH TABLE | 34 BYTES |
| 153~156 | POSITON OF ANY M TYPE PATH TABLE | CHARACTER |
| 157~190 | DIRECTORY RECORD FOR ROUTE DIRECTORY | 34 BYTES |
| 191~318 | VOLUME GROUP IDENTIFIER | CHARACTER |
| 319~446 | IDENTIFIER OF PUBLISHER | CHARACTER |
| 447~574 | IDENTIFIER OF DATA EDITOR | CHARACTER |
| 575~702 | IDENTIFIER OF APPLICATION SYSTEM | CHARACTER |
| 703~739 | IDENTIFIER OF COPYRIGHT FILE | CHARACTER |
| 740~776 | IDENTIFIER OF ABSTRACT FILE | CHARACTER |
| 777~813 | IDENTIFIER OF BIBLIOGRAPHY FILE | CHARACTER |
| 814~830 | DATE AND TIME OF VOLUME CREATION | NUMERIC, NUMERIC VALUE |
| 831~847 | DATE AND TIME OF VOLUME UPDATE | NUMERIC, NUMERIC VALUE |
| 848~864 | DATE AND TIME OF VOLUME EXPIRATION | NUMERIC, NUMERIC VALUE |
| 865~881 | DATE AND TIME OF VOLUME ISSUANCE | NUMERIC, NUMERIC VALUE |
| 882 | REVISION NUMBER OF FILE STRUCTURE | NUMERIC |
| 883 | (FOR FUTURE STANDARDIZATION) | (00H), BYTE |
| 884~1395 | FOR APPLICATION SYSTEM | NOT DEFINED |
| 884~1024 | (NOT USED) | |
| 1025~1042 | 《SYSTEM IDENTIFIER》 | |
| 1025~1030 | SYSTEM IDENTIFIER | |
| 1031~1032 | 1 — SYSTEM IDENTIFIER + REVISION NUMBER | CHARACTER, NUMERIC, NUMERIC VALUE, ETC. (01H, 00H) |
| 1033~1036 | RESERVED | |
| 1037 | 2 — NUBER-OF-DISC-SIDES IDENTIFIER | IDENTIFICATION OF SINGLE SIDED (00H) / DOUBLE SIDED (01H) |
| 1038 | 3 — DISC SIDE IDENTIFIER | IDENTIFICATION OF SIDE A (00H) / SIDE B (01H) |
| 1039~1042 | DEFAULT TITLE | DEFAULT REPRODUCTION FILE NUMBER |
| 1396~2048 | (FOR FUTURE STANDARDIZATION) | (00H) BYTE |

FIG. 3

| BP | COLUMN NAME | DATA TYPE |
|---|---|---|
| 1 | TYPE OF VOLUME DESCRIPTOR | NUMERIC VALUE, (FFH) |
| 2~6 | STANDARD IDENTIFIER | CD001 |
| 7 | REVISION NUMBER OF VOLUME DESCRIPTOR | NUMERIC VALUE, (01H) |
| 8~2048 | (FOR FUTURE STANDARDIZATION) | (00H) BYTE |

FIG. 4

| BP | COLUMN NAME | DATA TYPE |
|---|---|---|
| 1 | LENGTH OF DIRECTORY IDENTIFIER | (01H) |
| 2 | LENGTH OF EXTENDED ATTRIBUTE RECORD | (00H) |
| 3~6 | POSITION OF EXTENT | NUMERIC VALUE (POSITION OF L TYPE PATH TABLE |
| 7~8 | PARENT DIRECTORY NUMBER | (01H,00H) |
| 9~10 | DIRECTORY IDENTIFIER | (00H,00H) |

FIG. 5

| BP | COLUMN NAME | DATA TYPE |
|---|---|---|
| 1 | LENGTH OF DIRECTORY IDENTIFIER | (01H) |
| 2 | LENGTH OF EXTENDED ATTRIBUTE RECORD | (00H) |
| 3~6 | POSITION OF EXTENT | NUMERIC VALUE (POSITION OF M TYPE PATH TABLE |
| 7~8 | PARENT DIRECTORY NUMBER | (01H,00H) |
| 9~10 | DIRECTORY IDENTIFIER | (00H,00H) |

FIG. 6

| BP | COLUMN NAME | DATA TYPE |
|---|---|---|
| 1 | LENGTH OF DIRECTORY RECORD | (22H) |
| 2 | LENGTH OF EXTENDED ATTRIBUTE RECORD | (00H) |
| 3~10 | POSITION OF EXTENT | (POSITION OF DIRECTORY RECORD ITSELF) |
| 11~18 | DATA LENGTH | NUMERIC VALUE |
| 19~25 | DATE AND TIME OF RECORD | NUMERIC VALUE |
| 26 | FILE FLAG | (02H) |
| 27 | SIZE OF FILE UNIT | (00H) |
| 28 | SIZE OF INTERLEAVE INTERVALS | (00H) |
| 29~32 | VOLUME SEQUENCE NUMBER | NUMERIC VALUE |
| 33 | LENGTH OF FILE IDENTIFIER | (01H) |
| 34 | FILE IDENTIFIER | (00H) |

FIG. 7

| BP | COLUMN NAME | DATA TYPE |
|---|---|---|
| 1 | LENGTH OF DIRECTORY RECORD | (22H) |
| 2 | LENGTH OF EXTENDED ATTRIBUTE RECORD | (00H) |
| 3~10 | POSITION OF EXTENT | NUMERIC VALUE (POSITION OF DIRECTORY RECORD) |
| 11~18 | DATA LENGTH | NUMERIC VALUE |
| 19~25 | DATE AND TIME OF RECORD | NUMERIC VALUE |
| 26 | FILE FLAG | (02H) |
| 27 | SIZE OF FILE UNIT | (00H) |
| 28 | SIZE OF INTERLEAVE INTERVALS | (00H) |
| 29~32 | VOLUME SEQUENCE NUMBER | NUMERIC VALUE |
| 33 | LENGTH OF FILE IDENTIFIER | (01H) |
| 34 | FILE IDENTIFIER | (01H) |

FIG. 8

| BP | COLUMN NAME | DATA TYPE |
|---|---|---|
| 1 | LENGTH OF DIRECTORY RECORD | (3CH) |
| 2 | LENGTH OF EXTENDED ATTRIBUTE LENGTH | (00H) |
| 3~10 | POSITION OF EXTENT | NUMERIC VALUE (REAL STORAGE POSITION OF FILE!) |
| 11~18 | DATA LENGTH | NUMERIC VALUE |
| 19~25 | DATE AND TIME OF RECORD | NUMERIC VALUE |
| 26 | FILE FLAG | (00H) |
| 27 | SIZE OF FILE UNIT | (00H) |
| 28 | SIZE OF INTERLEAVE INTERVALS | (00H) |
| 29~32 | VOLUME SEQUENCE NUMBER | NUMERIC VALUE |
| 33 | LENGTH OF FILE IDENTIFIER | (0EH) |
| 34~47 | FILE IDENTIFIER | CHARACTER, NUMERIC (FILE NAME) |
| 48 | NOT USED | (00H) |
| 49~60 | SYSTEM USE | |
| 49~54 |   SYSTEM IDENTIFIER | CHARACTER, NUMERIC |
| 55~56 |   DISC IDENTIFIER+REVISION NUMBER | NUMERIC VALUE, ETC. |
| 57~60 |   RESERVED | (01H, 00H) |

FIG. 16

| PARAMETER | DESCRIPTION | NUMBER OF BYTES |
|---|---|---|
| FNAME | FILE NAME SAME AS FILE IDENTIFIER OF DIRECTORY RECORD | 15 BYTES |
| reserved | RESERVED | 1 BYTE |
| BN | BOOK NUMBER OF THIS STANDARD | 1 BYTE |
| VERS | REVISION NUMBER OF EACH BOOK NUMBER | 1 BYTE |
| VEND | VENDER IDENTIFIER OF UNIQUE NUMBER DESIGNATED FOR EACH VENDER | 2 BYTES |
| NVOL | VOLUME NUMBER OF ANY NUMBER DESIGNATED BY DISC PROVIDER | 1 BYTES |
| reserved | RESERVED | 15 BYTES |
| NCHAIN | NUMBER OF TOTAL PROGRAM CHAINS IN THIS FILE | 1 BYTES |
| NPROG | NUMBER OF TOTAL PROGRAMS IN THIS FILE | 1 BYTES |
| NCELL | NUMBER OF TOTAL PROGRAM CELLS IN THIS FILE | 2 BYTES |
| NDUT | NUMBER OF TOTAL DUTS IN THIS FILE | 4 BYTES |
| NSECT | NUMBER OF TOTAL SECTORS IN THIS FILE | 4 BYTES |
| reserved | RESERVED | 20 BYTES |
| PCHAINIT | POINTER TO CHAINIT BLOCK IN THIS FILE | 2 BYTES (NUMBER OF RELATIVE SECTORS) |
| PCELLIT | POINTER TO CELLIT BLOCK IN THIS FILE | 2 BYTES (NUMBER OF RELATIVE SECTORS) |
| PDAT | POINTER TO DAT BLOCK IN THIS FILE | 2 BYTES (NUMBER OF RELATIVE SECTORS) |
| reserved | RESERVED | 10 BYTES |
| PCHAINIT | POINTER TO CHAINIT BLOCK IN THIS FILE (FOR DUPLEX WRITING) | 2 BYTES (NUMBER OF RELATIVE SECTORS) |
| PCELLIT | POINTER TO CELLIT BLOCK IN THIS FILE (FOR DUPLEX WRITING) | 2 BYTES (NUMBER OF RELATIVE SECTORS) |
| PDAT | POINTER TO DAT BLOCK IN THIS FILE (FOR DUPLEX WRITING) | 2 BYTES (NUMBER OF RELATIVE SECTORS) |
| reserved | RESERVED | 10 BYTES |
| UDER | USER DEFINITION REGION | 928 BYTES OR MORE |

FIG.17

| PARAMETER | DESCRIPTION | NUMBER OF BYTES |
|---|---|---|
| LCHAINIT | TOTAL LENGTH OF CHAINIT REPRESENTED IN BYTES | 2 BYTES |
| CHAINMODE | MODE FOR ENTIRE CHAINS | 2 BYTES |
| reserved | RESERVED | 1 BYTE |
| NPROG | NUMBER OF PROGRAMS COMPOSING THIS PROGRAM CHAIN | 1 BYTE |
| NCELL | NUMBER OF PROGRAM CELLS COMPOSING THIS PROGRAM CHAIN | 2 BYTES |
| NDUT | NUMBER OF DATA UNITS COMPOSING THIS PROGRAM CHAIN | 4 BYTES |
| NCHNL | NUMBER OF MAXIMUM CHANNELS OF SUB IMAGE USED IN THIS PROGRAM CHAIN | 2 BYTES |
| NSTRM | NUMBER OF STREAMS OF AUDIO USED IN THIS PROGRAM CHAIN | 1 BYTE |
| reserved | RESERVED | 1 BYTE |
| ECMODE | ENCODING FORMAT IN THIS PROGRAM CHAIN | 1 BYTE |
| VATR | VIDEO DATA ATTRIBUTE OF THIS PROGRAM CHAIN | 3 BYTES |
| CPLET | SUB IMAGE COLOR PALETTE IN THIS PROGRAM CHAIN | 4 BYTES × 16 |
| SPATR | CHANNEL ATTRIBUTE OF EACH SUB IMAGE IN THIS PROGRAM CHAIN<br><br>b15  b14 b13  b12 b11 ~74  b8<br>\| RESOLUTION \| ASPECT \| TYPE \|<br>b7                                                              b0<br>\| SPECIFIC CODE \|<br>~73<br><br>· RESOLUTION  = 00 : FIELD RECORD<br>                            01 : FRAME RECORDING<br>· ASPECT         = 00 : 4 TO 3 DISPLAY<br>                            01 : 16 TO 9 DISPLAY<br>· TYPE            = 0000 : LANGUAGE<br>· SPECIFIC CODE = IN THE CASE OF TYPE (0000 : LANGUAGE), IT IS DESIGNATED CORRESPONDING TO LANGUAGE CODE. OTHER TYPES ARE RESERVED. | 2 BYTES × NCHNL |

FIG.18

| PARAMETER | DESCRIPTION | NUMBER OF BYTES |
|---|---|---|
| AATR | AUDIO ATTRIBUTE OF EACH STREAM IN THIS PROGRAM CHAIN | 2 BYTES × NSTRM |
| reserved | RESERVED | 1 BYTE |
| NBP | NUMBER OF BRANCH POINTS IN THIS PROGRAM CHAIN | 1 BYTE |
| BINFO | GROUP OF PROGRAM CELL NUMBERS SHARED WITH OTHER PROGRAM CHAINS | 2 BYTES × NBP |
| SCINFO | REPRODUCTION ORDER OF PROGRAM CELLS COMPOSING THIS PROGRAM CHAIN WRITTEN FOR NUMBER OF PROGRAM CELLS<br><br>61 — b31  b30 b29  b26 b27  ~72  b24<br>REPRODUCTION CONTROL \| ANGLE MODE \| ANGLE NUMBER<br>b23  71 —  b16<br>PROGRAM NUMBER<br>b15  b8<br>HIGH ORDER OF PROGRAM CELL NUMBER<br>b7  b0<br>LOW ORDER OF PROGRAM CELL NUMBER<br><br>• REPRODUCTION CONTROL = 00 : SUCCESSIVELY ADVANCES TO NEXT PROGRAM (PRESENCE OF CONTINUITY BETWEEN PROGRAMS)<br>01 : SUCCESSIVELY ADVANCES TO NEXT PROGRAM (ABSENCE OF CONTINUITY BETWEEN PROGRAMS)<br>10 : ADVANCES TO NEXT PROGRAM AFTER REPRODUCTION OF THIS PROGRAM WITH WAITING TIME DESIGNATED BY CELLIT.<br>11 : STOPS AFTER REPRODUCTION OF THIS PROGRAM<br>• ANGLE MODE = 00 : NO ANGLE BLOCK<br>01 : RESERVED<br>10 : START/CONTINUANCE OF ANGLE BLOCK<br>11 : END OF ANGLE BLOCK<br>• ANGLE NUMBER = xxxx : NUMBER IN ANGLE BLOCKS (DESIGNATES SERIAL NUMBER FROM START OF ANGLE BLOCKS. "0000 : DEFAULT REPRODUCTION)<br>• PROGRAM NUMBER = PROGRAM NUMBER OF PROGRAM CELL<br>• PROGRAM CELL NUMBER = PROGRAM CELL NUMBER TO BE REPRODUCED (2 BYTES) | 4 BYTES × NCELL |

FIG.19

| PARAMETER | DESCRIPTION | NUMBER OF BYTES |
|---|---|---|
| CELLMODE | DESIGNATES CELL MODE | 2 BYTES |
| PWAIT | WAIT TIME IN THE CASE THAT WAIT CONTROL IS DESIGNATED BY SCINFO IN CHAINIT (FROM 0 TO 255 SECONDS) | 1 BYTE |
| PRGNO | PROGRAM NUMBER OF THIS PROGRAM CELL | 1 BYTE |
| SDUT | FIRST NUMBER OF DUT COMPOSING THIS PROGRAM CELL | 4 BYTES |
| NDUT | NUMBER OF TOTAL DUTS COMPOSING THIS PROGRAM CELL | 2 BYTES |
| SADUT | FIRST SECTOR POSITION OF FIRST DUT COMPOSING THIS PROGRAM CELL (REPRESENTED BY NUMBER OF RELATIVE SECTORS FROM TOP OF FILE) | 4 BYTES |
| EADUT | FIRST SECTOR POSITION OF LAST DUT COMPOSING THIS PROGRAM CELL (REPRESENTED BY NUMBER OF RELATIVE SECTORS FROM TOP OF FILE) | 4 BYTES |

FIG.20

| PARAMETER | DESCRIPTION | NUMBER OF BYTES |
|---|---|---|
| TSADR | POSITION OF DUT REPRESENTED BY NUMBER OF RELATIVE SECTORS FROM TOP OF FILE | 4 BYTES |

| BRANCH NUMBER | SHARED PROGRAM CELL NUMBER (2 BYTES) |
|---|---|
| 0 | 0001h |
| 1 | 0002h |
| 2 | 0003h |

BRANCH INFORMATION OF CHAIN (A) (BINFO)

| BRANCH NUMBER | SHARED PROGRAM CELL NUMBER (2 BYTES) |
|---|---|
| 0 | 0001h |
| 1 | 0002h |

BRANCH INFORMATION OF CHAIN (B) (BINFO)

| BRANCH NUMBER | SHARED PROGRAM CELL NUMBER (2 BYTES) |
|---|---|
| 0 | 0003h |

BRANCH INFORMATION OF CHAIN (C) (BINFO)

FIG. 24A

NOTE) x = DON'T CARE

| NUMBER | REPRODUCTION CONTROL (2 BITS) | ANGLE MODE (2 BITS) | ANGLE NUMBER (4 BITS) | PROGRAM NUMBER (1 BYTE) | PROGRAM CELL NUMBER (2 BYTES) | REMARKS |
|---|---|---|---|---|---|---|
| 0 | 00 | 00 | xxxx | 00h | 0000h |  |
| 1 | 00 | 00 | xxxx | 01h | 0001h | SHARED |
| 2 | 00 | 00 | xxxx | 01h | 0002h | SHARED |
| 3 | 00 | 00 | xxxx | 01h | 0003h | SHARED |
| 4 | 11 | 00 | xxxx | 02h | 0004h |  |

BRANCH INFORMATION OF CHAIN (A) (SCINFO)

FIG. 24B

NOTE) x = DON'T CARE

| NUMBER | REPRODUCTION CONTROL (2 BITS) | ANGLE MODE (2 BITS) | ANGLE NUMBER (4 BITS) | PROGRAM NUMBER (1 BYTE) | PROGRAM CELL NUMBER (2 BYTES) | REMARKS |
|---|---|---|---|---|---|---|
| 0 | 00 | 00 | xxxx | 00h | 0005h |  |
| 1 | 00 | 00 | xxxx | 00h | 0001h | SHARED |
| 2 | 00 | 00 | xxxx | 00h | 0002h | SHARED |
| 3 | 11 | 00 | xxxx | 00h | 0006h |  |

BRANCH INFORMATION OF CHAIN (B) (SCINFO)

FIG. 24C

NOTE) x = DON'T CARE

| NUMBER | REPRODUCTION CONTROL (2 BITS) | ANGLE MODE (2 BITS) | ANGLE NUMBER (4 BITS) | PROGRAM NUMBER (1 BYTE) | PROGRAM CELL NUMBER (2 BYTES) | REMARKS |
|---|---|---|---|---|---|---|
| 0 | 00 | 00 | xxxx | 00h | 0007h |  |
| 1 | 00 | 00 | xxxx | 00h | 0003h | SHARED |
| 2 | 11 | 00 | xxxx | 00h | 0008h |  |

BRANCH INFORMATION OF CHAIN (C) (SCINFO)

FIG. 25A
PROGRAM CHAIN (A)
PROGRAM CELL NUMBER:
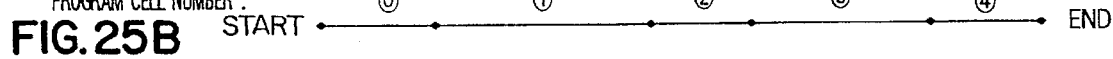
FIG. 25B
PROGRAM CHAIN (B)
PROGRAM CELL NUMBER:
FIG. 25C
PROGRAM CHAIN (C)
PROGRAM CELL NUMBER:
TIME ⟶
( PROGRAM CELL : •—•)
FIG.26
NOTE) x = DON'T CARE
| NUMBER | REPRODUCTION CONTROL (2 BITS) | ANGLE MODE (2 BITS) | ANGLE NUMBER (4 BITS) | PROGRAM NUMBER (1 BYTE) | PROGRAM CELL NUMBER (2 BYTES) | REMARKS |
|---|---|---|---|---|---|---|
| 0 | 00 | 00 | xxxx | 01h | 0000h | |
| 1 | 01 | 00 | xxxx | 01h | 0001h | |
| 2 | 00 | 00 | xxxx | 01h | 0004h | |
| 3 | 10 | 00 | xxxx | 01h | 0002h | |
| 4 | 11 | 00 | xxxx | 01h | 0003h | |
61

| NUMBER | REPRODUCTION CONTROL (2 BITS) 61 | ANGLE MODE (2 BITS) 71 | ANGLE NUMBER (4 BITS) 72 | PROGRAM NUMBER (1 BYTE) | PROGRAM CELL NUMBER (2 BYTES) | REMARKS |
|---|---|---|---|---|---|---|
| 0 | 00 | 00 | xxxx | 01h | 0000h | |
| 1 | 00 | 10 | 0000 | 01h | 0001h | |
| 2 | 00 | 10 | 0001 | 01h | 0005h | DESIGNATED |
| 3 | 00 | 11 | 0002 | 01h | 0006h | |
| 4 | 00 | 00 | xxxx | 01h | 0002h | |
| 5 | 00 | 10 | 0000 | 01h | 0003h | |
| 6 | 00 | 11 | 0001 | 01h | 0007h | |
| 7 | 11 | 00 | xxxx | 01h | 0004h | |

NOTE) x = DON'T CARE

- REPRODUCTION CONTROL ··· 00 : SUCCESSIVELY ADVANCES TO NEXT CELL
  01 : RESERVED
  10 : PAUSE
  11 : END OF SEQUENCE

- BLOCK MODE ··· 00 : NO BLOCK CELL
  01 : TOP BLOCK CELL
  10 : BLOCK CELL EXCEPT TOP CELL AND END CELL
  11 : END BLOCK CELL

- BLOCK TYPE ··· 0000 : NO BLOCK
  0001 : ANGLE BLOCK
  0010 : MENU BLOCK
  OTHERS : RESERVED

- CELL NUMBER ··· 2 BYTES

FIG.33

| PARAMETER | DESCRIPTION | NUMBER OF BYTES |
|---|---|---|
| CCAT | CELL TYPE | 2 BYTES |
| CTIME | TOTAL TIME OF CELLS | 4 BYTES |
| CSADUT | TOP ADDRESS OF CELLS | 4 BYTES |
| CEADUT | END ADDRESS OF CELLS | 4 BYTES |

[CCAT] PARAMETER

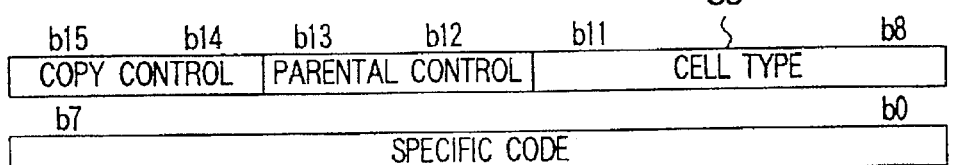

- CELL TYPE ···　0000 : MOVIE
　　　　　　　　0001 : ORCHESTRAL MUSIC PROGRAM
　　　　　　　　1000 : FILE SELECTING MENU
　　　　　　　　1001 : SEQUENCE SELECTING MENU
　　　　　　　　1010 : AUDIO STREAM SELECTING MENU
　　　　　　　　1011 : SUB VIDEO CHANNEL SELECTING MENU
　　　　　　　　1100 : PROGRAM SELECTING MENU
　　　　　　　　1101 : ANGLE SELECTING MENU
　　　　　　　　OTHERS : RESERVED
- SPECIFIC CODE ··· WHEN CELL TYPE IS MENU, LANGUAGE CODE IS WRITTEN.

FILE SELECTING MENU

→ SUB VIDEO CHANNEL SELECTING MENU
→ SUB AUDIO STREAM SELECTING MENU
→ SEQUENCE SELECTING MENU

→ ANGLE SELECTING MENU
→ PROGRAM SELECTING MENU

→ PROGRAM SELECTING MENU

→ ANGLE SELECTING MENU

FIG.39

| CELL NUMBER | SPECIFIC CODE | BLOCK TYPE | BLOCK MODE |
|---|---|---|---|
| 0 | JAPANESE | MENU | BLOCK START |
| 1 | JAPANESE | MENU | BLOCK REGION |
| 2 | ENGLISH | MENU | BLOCK REGION |
| 3 | ENGLISH | MENU | BLOCK END |

RECORDING MEDIUM AND REPRODUCING APPARATUS THEREOF

This is a division of application Ser. No. 08/421,743, filed Apr. 13, 1995 now pending.

BACKGROUND OF THE INVENTION

1. Field of the Invention

The present invention relates to a recording medium, such as an optical disc, and a reproducing apparatus thereof.

2. Description of the Related Art

Generally, management information is recorded on an optical disc. The management information manages data (files) recorded on the optical disc. As a representative example, management information defined as ISO-9660 standard is known. The management information includes at least ID information and the size of each disc, the number and reproducing order of discs that correlate, and the ID information, the record position, and the size of each file recorded on the disc as structural elements.

However, in recent years, discs that have the management information corresponding to the ISO-9660 standard are categorized as various types such as specific discs, single-sided discs, and double-sided discs. However, the conventional management information does not include information that distinguishes such disc types.

The management information is especially important for system operation. In other words, if the management information is damaged, the entire information on the disc will be lost. To prevent such a problem, the same management information is recorded in another region as a spare. To further improve the safety of the management information, as shown in FIG. 40, the spare management information is recorded in a multiplexed fashion at multiple regions on the disc. However, in this case, the spare management information is recorded at a different record position as shown by arrow A. Thus, each portion of duplicated management information management will have a different value that represents the position thereof. Thus, as the number of regions of the spare management information is increased, the work load of the disc provider increases.

Moreover, in recent years, as the storage capacity of optical discs increases, discs that record a plurality of stories with slightly different contents and that reproduce any story selected by the user are known. However, in this case, since the same data for each story is recorded in a multiplexed fashion, the efficiency of the disc storage capacity is remarkably low.

Furthermore, in recent years, as a technique for selectively reproducing a variety of data recorded on the disc, menus are used. When menus are composed, for example, as shown in FIG. 41, a menu list and memory image information are recorded at predetermined regions of the disc. In the menu list, the record position of menu image information corresponding to each menu number and the file record position corresponding to each menu selection number are recorded. When any menu number is selected (at step 1), a corresponding menu image information is read (at step 3) based on an address on the menu list (at step 2). Thus, the menu screen is displayed. When any file number is selected from the menu screen (at step 4), the record position of the desired file is determined corresponding to the menu list (at step 5) and the desired file is reproduced (at step 6).

However, in the above-described method using the menu list, as the number of selection items increases, the size of the menu list increases and the ratio of the data amount of the menu to the entire record data amount increases, thereby lowering the efficiency of the disc storage capacity.

SUMMARY OF THE INVENTION

A first object of the present invention is to provide a recording medium and a reproducing apparatus thereof that can determine the types of a recording medium and individual files corresponding to a data record format.

A second object of the present invention is to provide a recording medium and a reproducing apparatus thereof that determine the number of recording sides and a recording surface thereof.

A third object of the present invention is to provide a recording medium that does not need to change values that represent positions of regions of spare management information recorded in a multiplexed fashion.

A fourth object of the present invention is to provide a recording medium and a recording medium reproducing apparatus that does not need to in a multiplexed fashion record the same data.

A fifth object of the present invention is to provide a recording medium and a reproducing apparatus thereof that do not increase the ratio of menu data amount to the entire data amount even if the number of menu selection items increases.

To accomplish such objects, a first aspect of the present invention is a recording medium comprising a data region in which data is recorded as a file corresponding to a predetermined data recording format, and a management region including medium identifying information that represents the type of the data recording format and file identifying information that represents the type of the data recording format of the file.

A second aspect of the present invention is a reproducing apparatus, comprising a first determining means for reading medium identifying information recorded in the management region and determining a type of a data recording format of the recording medium corresponding to the medium identifying information, and a second determining means for reading the file identifying information of each file recorded in the management region and determining a type of each file recorded on the recording medium corresponding to the file identifying information.

Thus, according to the present invention, the type of the recording format for a recording medium and the type of files can be determined. Consequently, a recording medium and files dedicated for a specific system can be provided.

A third aspect of the present invention is a recording medium having two opposite sides, either or both of which are selective as recording sides, comprising a data region in which data is recorded, and a management region including number-of-recording-sides identifying information that represents the number of recording sides of the recording medium and recording side identifying information that represents the recording side.

A fourth aspect of the present invention is a reproducing apparatus, comprising a number-of-recording-sides determining means for reading the number-of-recording-sides identifying information recorded in the management region and determining the number of recording sides of the recording medium, and a recording-side determining means for reading the recording-side identifying information recorded in the management region and determining the recording side of the recording medium to be reproduced.

Thus, according to the present invention, different types of recording mediums that are for example single-sided type and double-sided type can be handled.

A fifth aspect of the present invention is a recording medium, comprising a data region in which data is recorded, a management region in which management information is recorded, the management information being adapted for managing data recorded in the data region, and a plurality of spare management regions in which management information with the same content as the management region is recorded, values representing the positions in the spare management regions being represented with relative distance from the top addresses thereof.

Thus, it is not necessary to change the value that represents the position of each management information.

A sixth aspect of the present invention is a recording medium on which data is recorded as a file, the file comprising a first region in which a data unit group that is a group of a plurality of types of data that are synchronously reproduced, a second region in which at least one cell information table that is a program cell composed by selectively linking at least one data unit recorded in the first region, and a third region in which at least one chain information that is a program chain composed by selectively linking at least one cell information table recorded in the second region.

A seventh aspect of the present invention is a reproducing apparatus comprising a first searching means for searching any chain information table recorded in the third region, a second searching means for searching at least one cell information table that composes the program chain from the second region corresponding to the searched chain information table, and a third searching means for searching at least one data unit that composes the program cell from the first region corresponding to the cell information table searched by the second searching means.

Thus, according to the present invention, the same program cell can be shared with a plurality of program chains. Consequently, the same data can be prevented from being redundantly recorded. As a result, the efficiency of the recording capacity of the recording medium can be maximized.

An eighth aspect of the present invention is a recording medium, wherein the file includes at least one cell information table that composes a menu screen on which any data item to be displayed is selected, and wherein the cell information table that composes the menu screen includes identifying information that represents that the cell information table composes the menu screen.

A ninth aspect of the present invention is a reproducing apparatus, comprising means for determining a cell information table that composes a menu screen corresponding to the identifying information and means for reproducing the menu screen corresponding to the cell information table.

Thus, according to the present invention, it is not necessary to record a menu list and so forth in other than a file. Consequently, even if the number of selection items increases, the ratio of the menu data amount to the entire record data amount does not increase.

A tenth aspect of the present invention is a recording medium, wherein the chain information table that composes the program chain with the cell information table that composes the menu screen includes block mode information that defines a cell information group that composes the menu screens that correlate as-one block.

An eleventh aspect of the present invention is a recording apparatus, comprising a means for recognizing the correlation among a plurality of menu screens included in the chain information table corresponding to the block mode information in the chain information table searched by the first searching means, and a means for reproducing a second menu screen after a first menu screen is selected, when the recognizing means has determined that there is correlation between the first menu screen that is being reproduced and the second menu screen.

A twelfth aspect of the present invention is a recording medium, wherein the cell information table that composes the menu screen further includes language type information that represents a language type of characters displayed on the menu screen.

A thirteenth aspect of the present invention is a reproducing apparatus, comprising a means for determining whether or not a language type of the menu screen composed of the cell information table on the menu screen matches a language type selected by the language type selecting means corresponding to the language type information in the cell information table when the determining means has determined the cell information table that composes the menu screen, and a means for reproducing at least one data unit searched by the third searching means as the menu screen.

Thus, according to the present invention, only a menu screen with a language type selected by the user reproduced from a plurality of cell information tables so as to compose a menu screen with same content but different languages.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is an example of PVD table;

FIG. 3 is an example of VTD table;

FIG. 4 is an example of L type PT table;

FIG. 5 is an example of M type PT table;

FIG. 6 is an example of DR(00) table;

FIG. 7 is an example of DR(01) table;

FIG. 8 is an example of file (n) table;

FIG. 16 is an example of a file management table;

FIG. 17 is an example of a chain information table;

FIG. 18 is another example of a chain information table;

FIG. 19 is an example of a cell information table;

FIG. 20 is an example of a DAT;

FIGS. 24A–24C illustrate tables showing chain control information of three program chains;

FIGS. 24A–24C are schematic diagrams showing a reproducing process of three chain programs;

FIG. 26 is a table showing control information of a program chain;

FIG. 33 is a table and a schematic diagram showing a structure of a cell information table that composes a menu screen;

FIG. 39 is a table showing a cell information table group that composes a plurality of menu screens with different languages;

DESCRIPTION OF THE PREFERRED EMBODIMENT

Next, with reference to the accompanying drawings, an embodiment of the present invention will be described.

Figure 1:
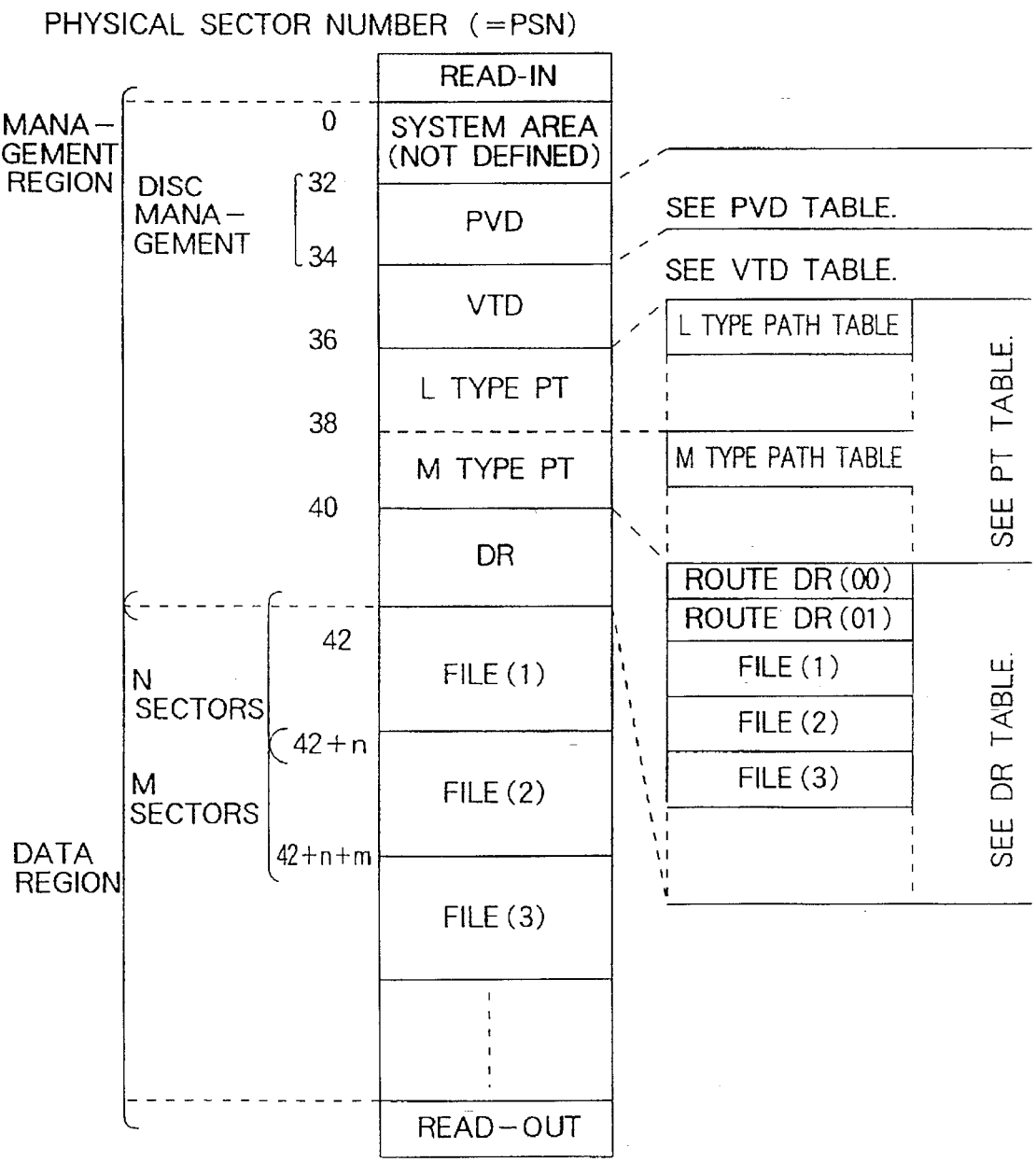
FIG. 1 is a schematic diagram showing a data structure of an optical disc according to an embodiment of the present invention.

FIG. 1 a schematic diagram showing a data structure of an optical disc according to an embodiment of the present invention.

The data structure of the disc is based on ISO-9660 standard. The record space of the disc is divided into a read-in region, a management region, a data region, and a read-out region. The management region includes a system area, a PVD (Primary Volume Descriptor) table, a VTD (Volume Terminate Descriptor) table, a PT (Path Table), and a DR (Directory Record). The data region is composed of a plurality of files. The physical sector size is 1024 bytes. The logical sector size is 2048 bytes. The logical block size is 1024 bytes.

As shown in FIG. 2, in the PVD table of the management region, information of the disc (volume) such as the size of the volume, the attribute of the volume, the position of the route DR, and the position of the PT is written. The content of the VTD table is defined as shown in FIG. 3. In the PT (L type PT or M type PT), as shown in FIGS. 4 and 5, hierarchical structures between DRs are written. The DR is a table group that are composed of a route DR (00) table, a route DR (01) table, and a file (n) table. In the route DR (00) table and the route DR (01) table, as shown in FIGS. 6 and 7, the positions thereof are written. The file (n) table is provided for each file in the data region. As shown in FIG. 8, in the file (n) table, the position of the file and so forth are written.

As shown in FIG. 2, the PVD table is provided with an application system region. In the application system region, a disc identifier 1, a number-of-disc-sides identifier 2, a disc side identifier 3, and so forth are recorded. The disc identifier 1 represents the type of the data recording format of the disc. The number-of-disc-sides identifier 2 represents whether the disc is a double-sided disc or a single-sided disc. The disc side identifier 3 represents whether side A or side B of a double-sided disc is being reproduced. In the PVD table, the value of the BP represents the byte position from the top of the table.

As shown in FIG. 8, the file (n) table corresponding to each file is provided with an application system region. In the application system region, information (disc identifier) 4 and so forth are recorded. The disc identifier 4 represents the type of the data recording format of the file.

Figure 9:
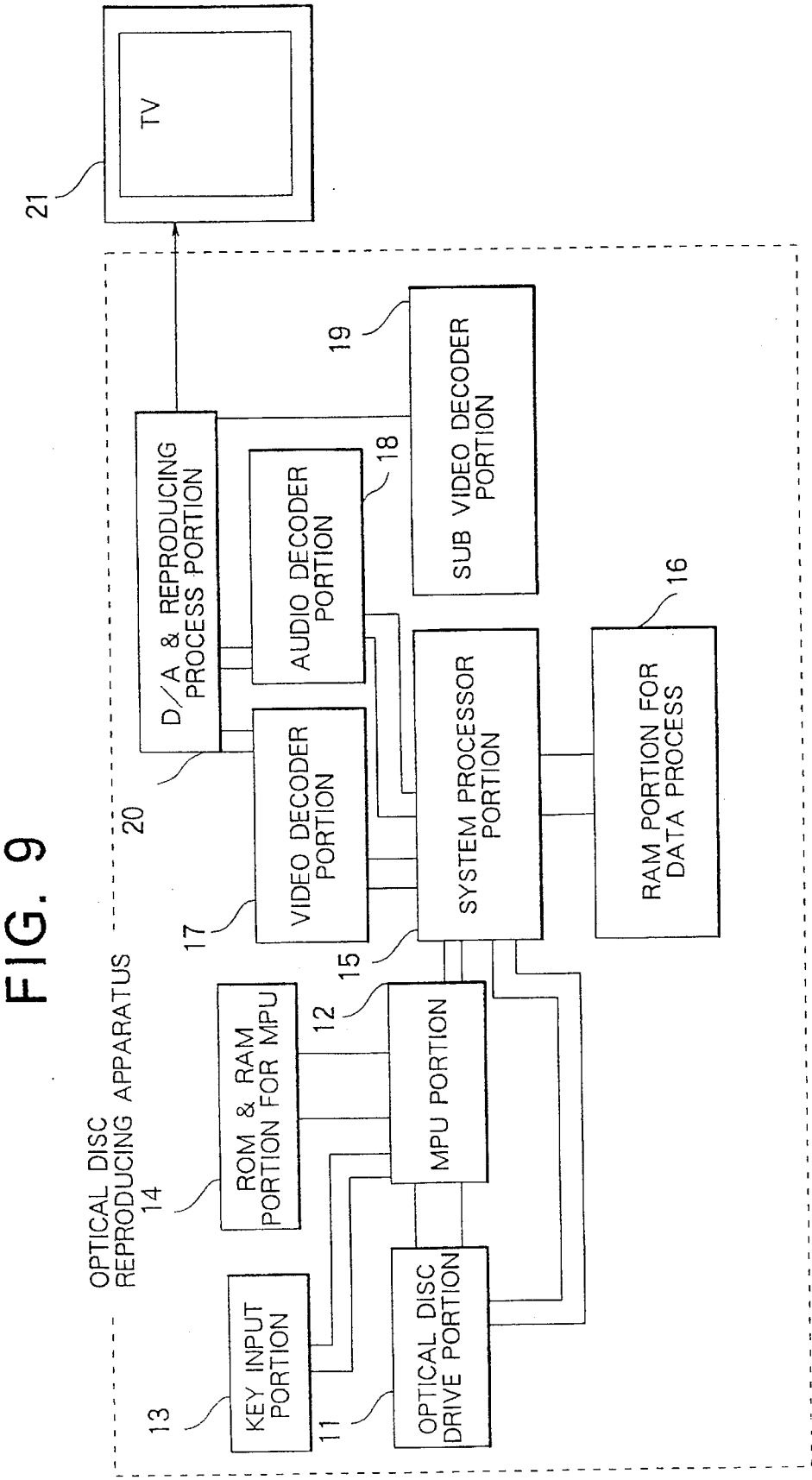
FIG. 9 is a block diagram showing a construction of an optical disc reproducing apparatus that reproduces data from the disc shown in FIG. 1.

FIG. 9 is a schematic diagram showing a construction of an optical disc reproducing apparatus that reproduces data from a disc that has the above-described data structure. In FIG. 9, reference numeral 11 is an optical disc drive portion that drives the optical disc and reads data from the optical disc through an optical pickup. Reference numeral 12 is an MPU (Micro Processor Unit) that controls the entire system of the apparatus. Reference numeral 13 is a key input portion that supplies a user command to the MPU 12. Reference numeral 14 is an RAM portion that is used as a working region for a ROM and the MPU 12. In the ROM, a control program for the MPU 12 is stored. Reference numeral 15 is a system processor portion that demodulates and error-corrects the data that is output from the optical drive portion 11 and divides the error-corrected data into three types of data that are video (main image), audio, and sub video. Reference numeral 16 is a RAM portion that processes data. Reference numerals 17, 18, and 19 are a video decoder portion, an audio decoder portion, and a sub video decoder portion that decode the video data, the audio data, and the sub video data that are output from the system processor portion 15, respectively. Reference numeral 20 is a D/A & reproducing process portion that converts each decoded data into an analog signal, multiplexes the video data and the sub video data, and outputs the multiplexed data to an image and sound output portion 21.

Figure 10:
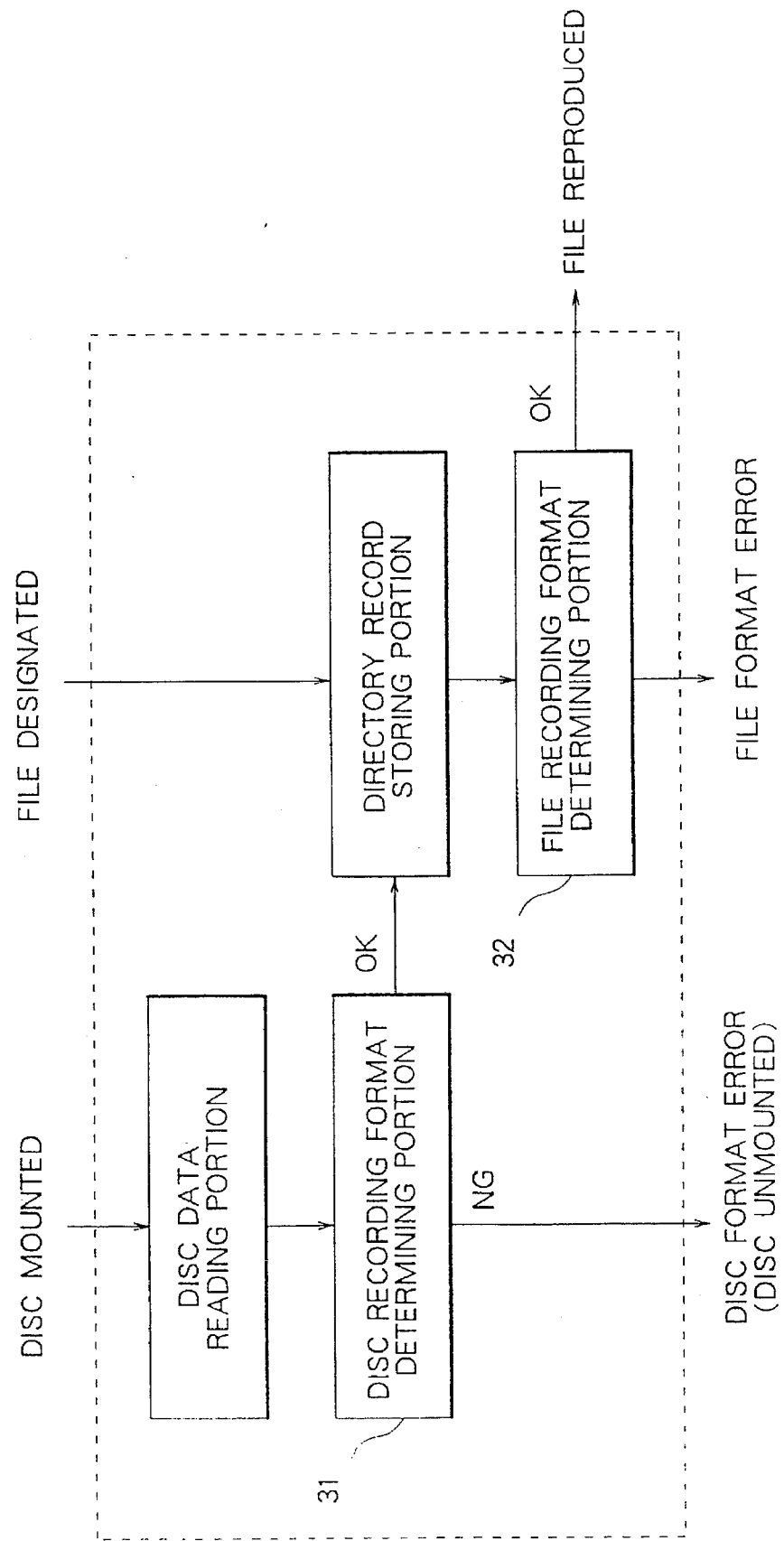
FIG. 10 is a block diagram showing a construction of a device that determines the types of a disc and a file corresponding to a data recording format.
Figure 11:
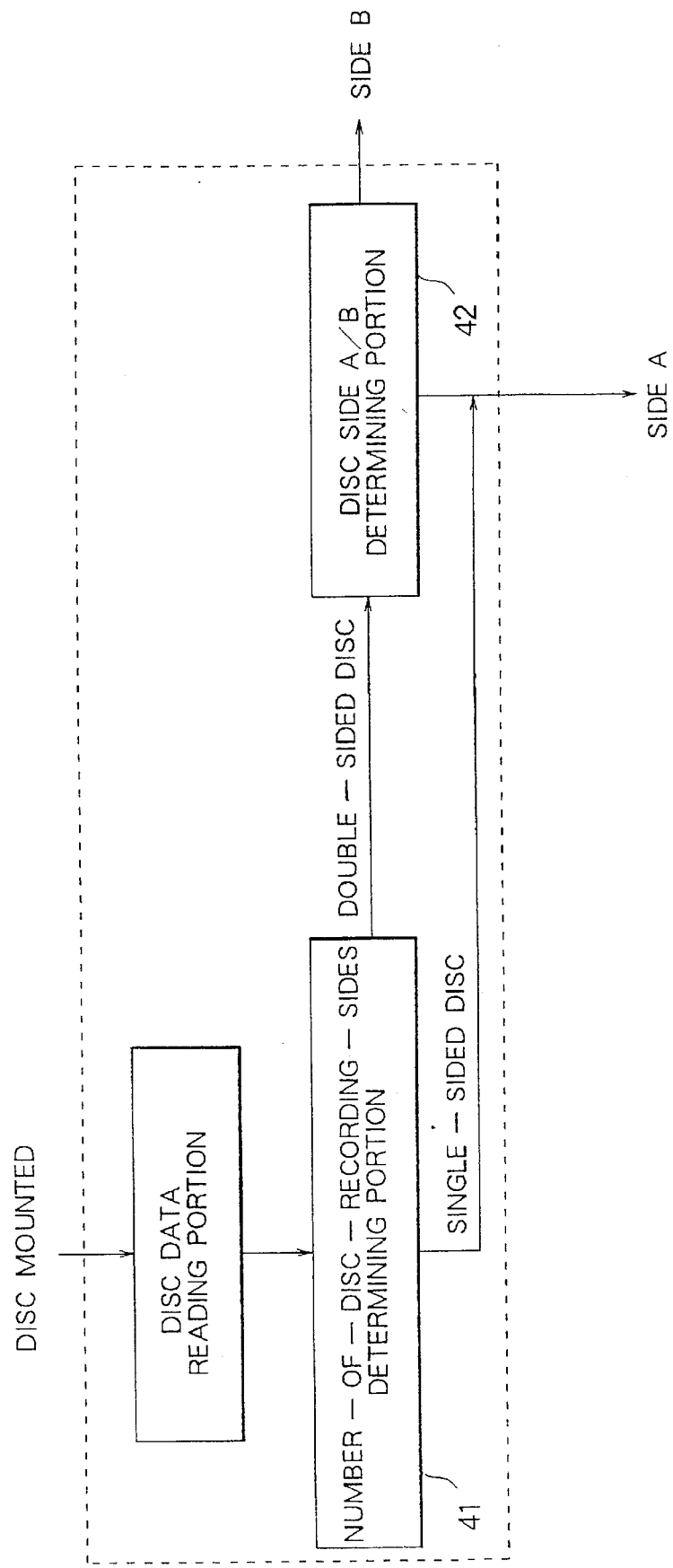
FIG. 11 is a block diagram showing a construction of a function that determines the number of recording sides and a reproducing side of a disc.
Figure 12:
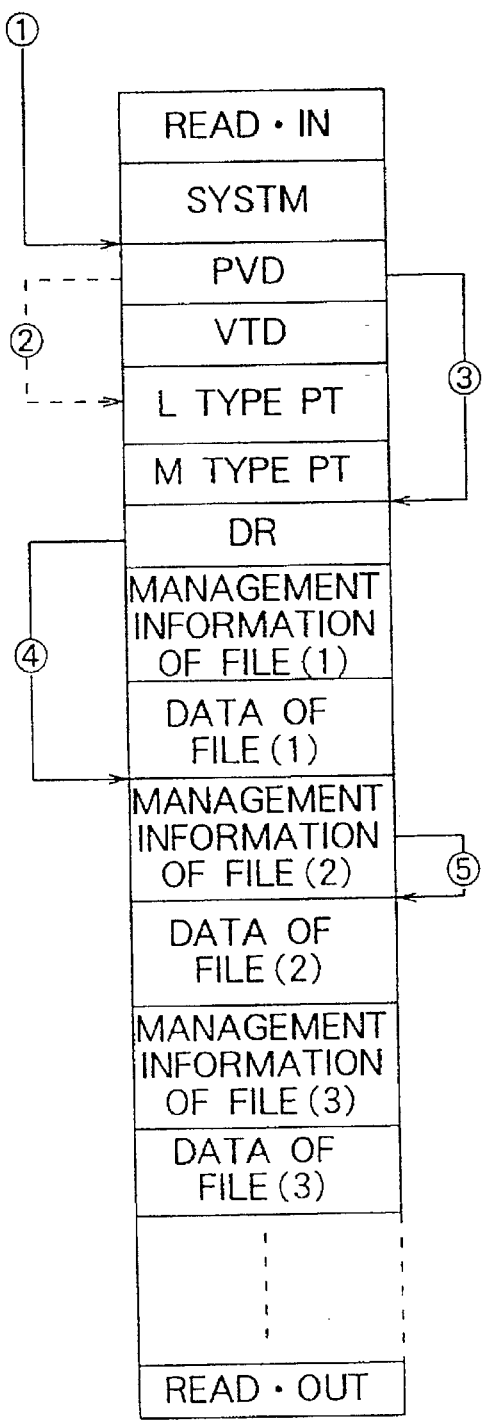
FIG. 12 is a schematic diagram showing a file access process of a data structure.
Figure 13:
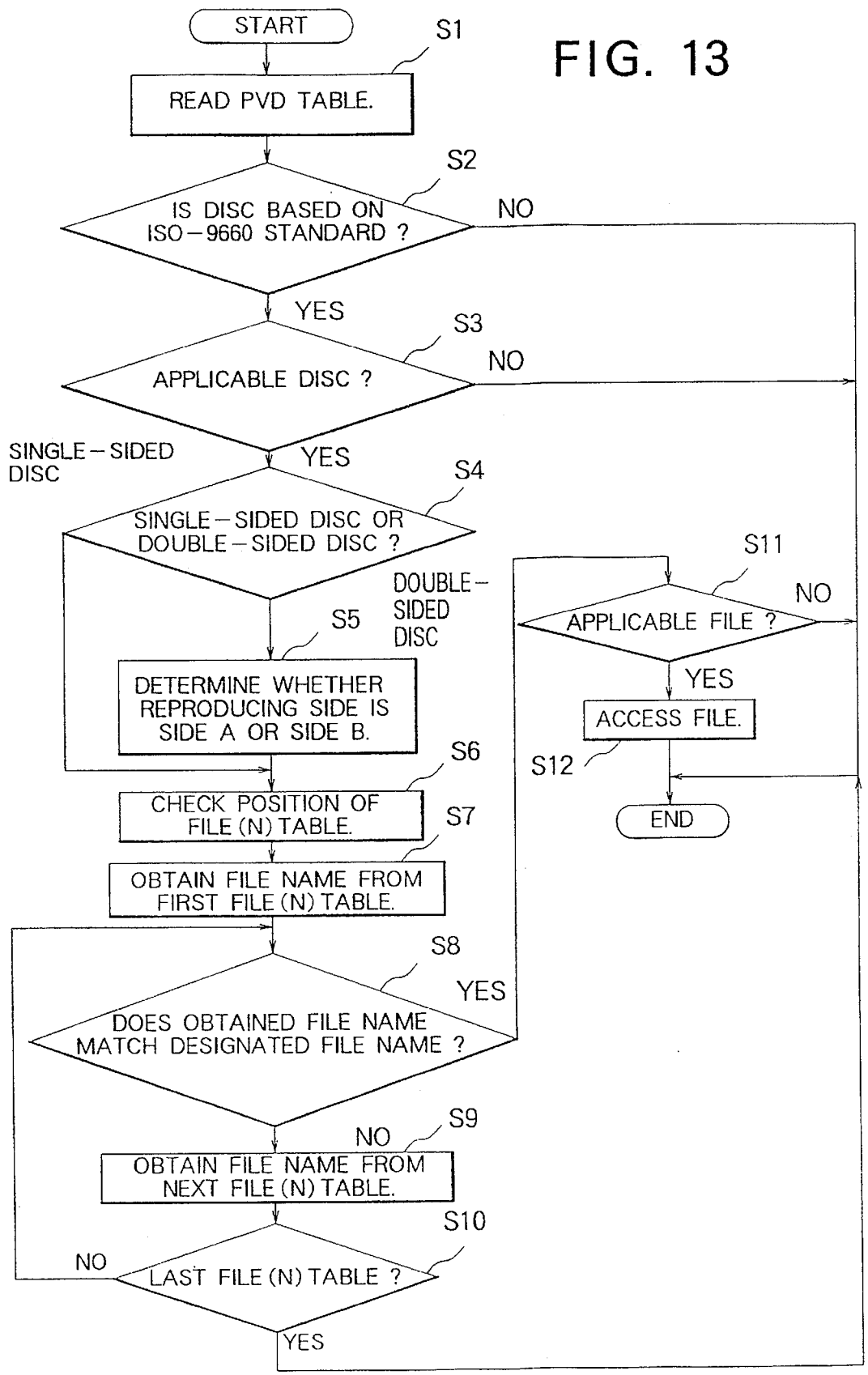
FIG. 13 is a flow chart showing a file access process.

Next, with reference to FIGS. 10 to 13, the operation of the optical disc reproducing apparatus will be described. FIG. 10 is a block diagram showing a construction of a device that determines the types of a disc and a file corresponding to the data recording format of the disc. FIG. 11 is a schematic diagram showing a construction of a device that determines the number of recording sides of the disc and the reproducing side. FIG. 12 is a schematic diagram showing a file access process of the data structure shown in FIG. 1. FIG. 13 is a flow chart showing a file access process.

After the disc reproducing apparatus is activated or the disc is replaced, the reproducing apparatus reads the PVD table (at step 1). Thereafter, the reproducing apparatus determines whether or not the disc is based on the ISO-9660 standard corresponding to the standard identifier in the PVD table (at step 2). When the disc is based on the ISO-9660 standard, a disc recording format determining portion 31 of the reproducing apparatus checks the disc identifier 1 recorded in the application system region of the PVD table and determines whether or not the reproducing apparatus can reproduce data from the disc (applicable disc) (at step 3).

When the mounted disc is an applicable disc, a number-of-disc-recording-sides determining portion 41 of the reproducing apparatus determines the number-of-disc-sides identifier 2 recorded in the application system region (at step 4). When the mounted disc is a double-sided disc, a disc side A/B determining portion 42 of the reproducing apparatus checks the disc side identifier 3 recorded in the application system region and determines whether the reproducing side is side A or side B (at step 5).

Thereafter, the reproducing apparatus reads the PT and determines the hierarchical structure between the DRs. Next, the reproducing apparatus reads the route RD and determines the position of each file (n) table (at step 6). After that, the reproducing apparatus obtains a file name from the first file (n) table (at step 7) and determines whether or not the file name matches a predetermined file name (at step 8). When these file names do not match, the reproducing apparatus obtains the next file name (at step 9) and repeats the same operation. When these files match, a file record format determining portion 32 shown in FIG. 10 of the reproducing apparatus checks the information (disc identifier) 4 in the application system region of the file (n) table in the matched file and determines whether or not the file is applicable for the reproducing apparatus (at step 11). When the file is not applicable, the process is terminated. When the file is applicable, the reproducing apparatus checks the record position of the file corresponding to the file (n) table and accesses the file (at step 12).

Next, the multiplex recording method of the management information will be described.

On the disc, the same management information as the information recorded in the management region is recorded at a plurality of positions other than the positions of the management region and the data region.

Figure 14:
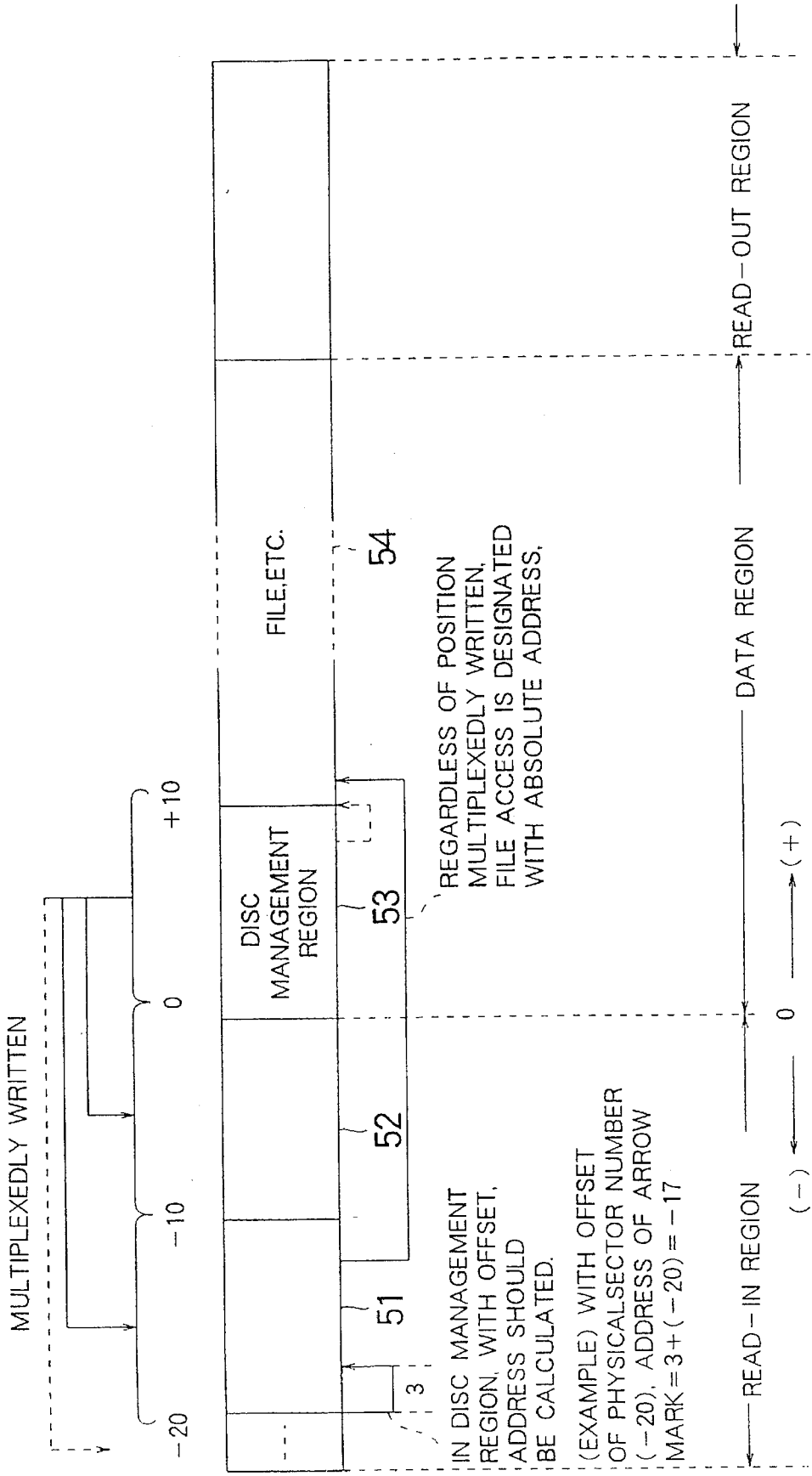
FIG. 14 is a schematic diagram showing disc management information in a multiplexed fashion written to a read-in region.

FIG. 14 shows the spare management information that is written at a plurality of positions in the read-in region in a multiplexed fashion. As shown in FIG. 14, the values that represent the positions of individual spare management information are defined by the relative distance (number of sectors) from the top addresses of the spare management regions 51 and 52.

The absolute addresses that represent the positions in a management region 53 and a data region 54 are defined by the relative distance (the number of sectors) from the top address of the management region 53. Thus, when any position of the spare management region 51 or 52 is accessed, by adding the value of a desired absolute address and an offset value of the top address of the spare management region 51 or 52, the value of the absolute address can be calculated. For example, when the top address of the first spare management region 51 is −20, the address represented by the absolute address 3 is calculated by the following expression.

$$3+(-20)=-17$$

Likewise, when the top address of the second spare management region 52 is −10, the address represented by the absolute address 3 can be calculated by the following expression.

$$3+(-10)=-7$$

Figure 15:
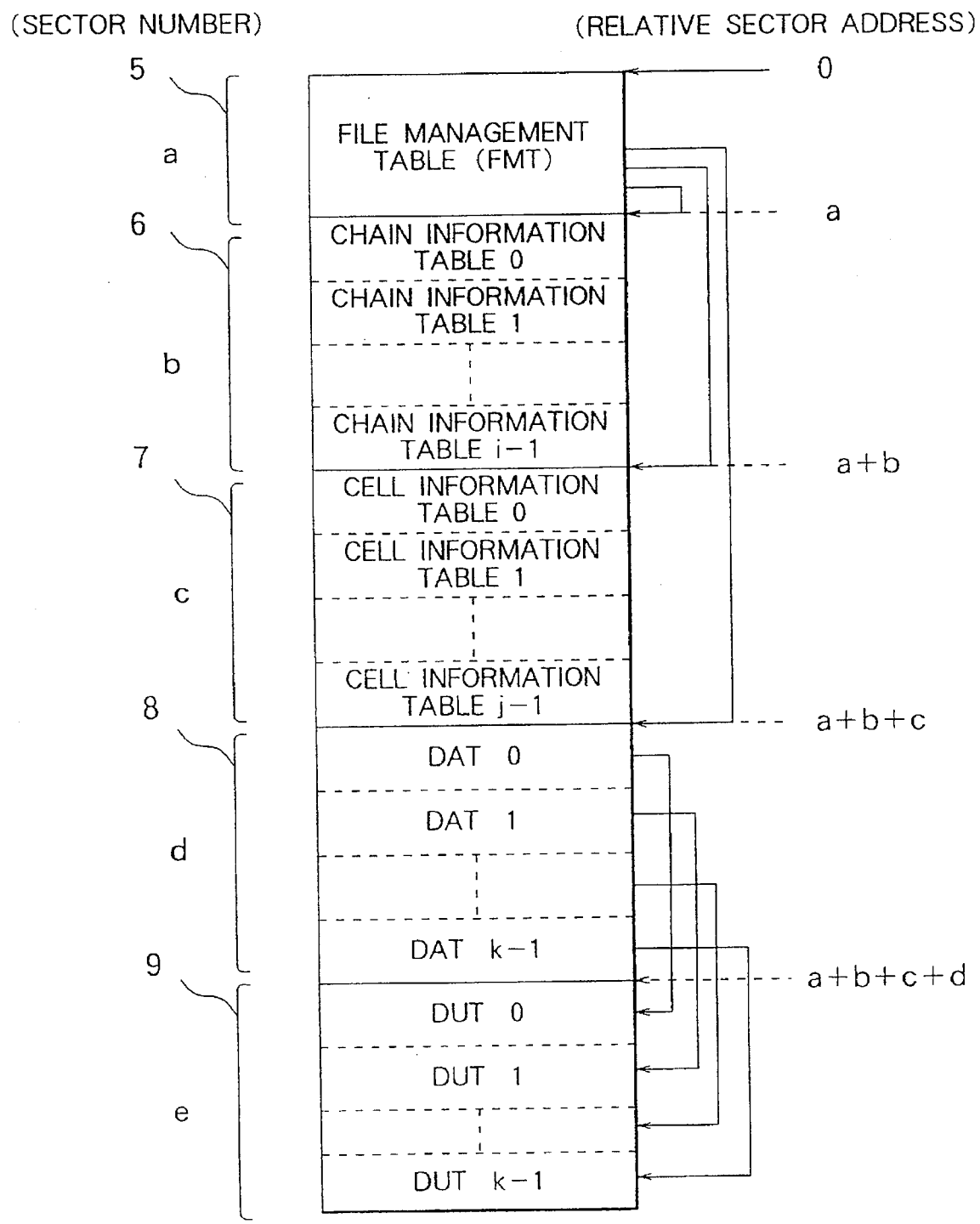
FIG. 15 is a schematic diagram showing a data structure of a file.

Next, the data structure of the file recorded in the data region of the disc will be described. FIG. 15 is a schematic diagram showing the data structure of the file. As shown in FIG. 15, the file includes a file management table 5, a group of chain information tables 6, a group of cell information tables 7, a group of DUT allocation tables (referred to as DATs) 8, and a group of DUTs (data units) 9.

As shown in FIG. 16, the file management table 5 includes the number of chain information tables, the number of cell information tables, the number of DUTs (data units), the number of sectors, and pointers that represent the top of each table.

As shown in FIGS. 17 and 18, in the chain information table 6, information that composes a program chain is written. A program chain is a unit that composes one story. Each program chain is composed by linking a plurality of programs in the order of the reproduction. A program is composed of a group of at least one unit called a program cell. In other words, the chain information table 6 includes information that composes one program chain in which a plurality of cell information tables 7 are selectively linked. In the file, a plurality of chain information tables 6 are successively placed in the order of chain numbers.

As shown in FIG. 19, in the cell information table 7, information that composes program cells is written. A program cell is a part that composes one program. Each program cell is composed by linking a plurality of DUTs in the order of reproduction. In other words, the cell information table 7 includes information that composes one program cell in which a plurality of DUTs 9 are selectively linked. In the file, a plurality of cell information tables 7 are successively linked in the order of cell numbers.

As shown in FIG. 20, in the DAT 8, information that represents the position of the DUT is written as the relative distance (number of sectors) from the top of the file. In the file, a plurality of DATs 8 are successively placed in the order of the DUT numbers.

The DUT 9 is composed of a plurality of types of data that are video data, audio data, sub video data that are synchronously reproduced. The reproducing time of each DUT 9 is not defined. In the file, the DUTs 9 are placed in the order of the DUT numbers.

Figure 21:
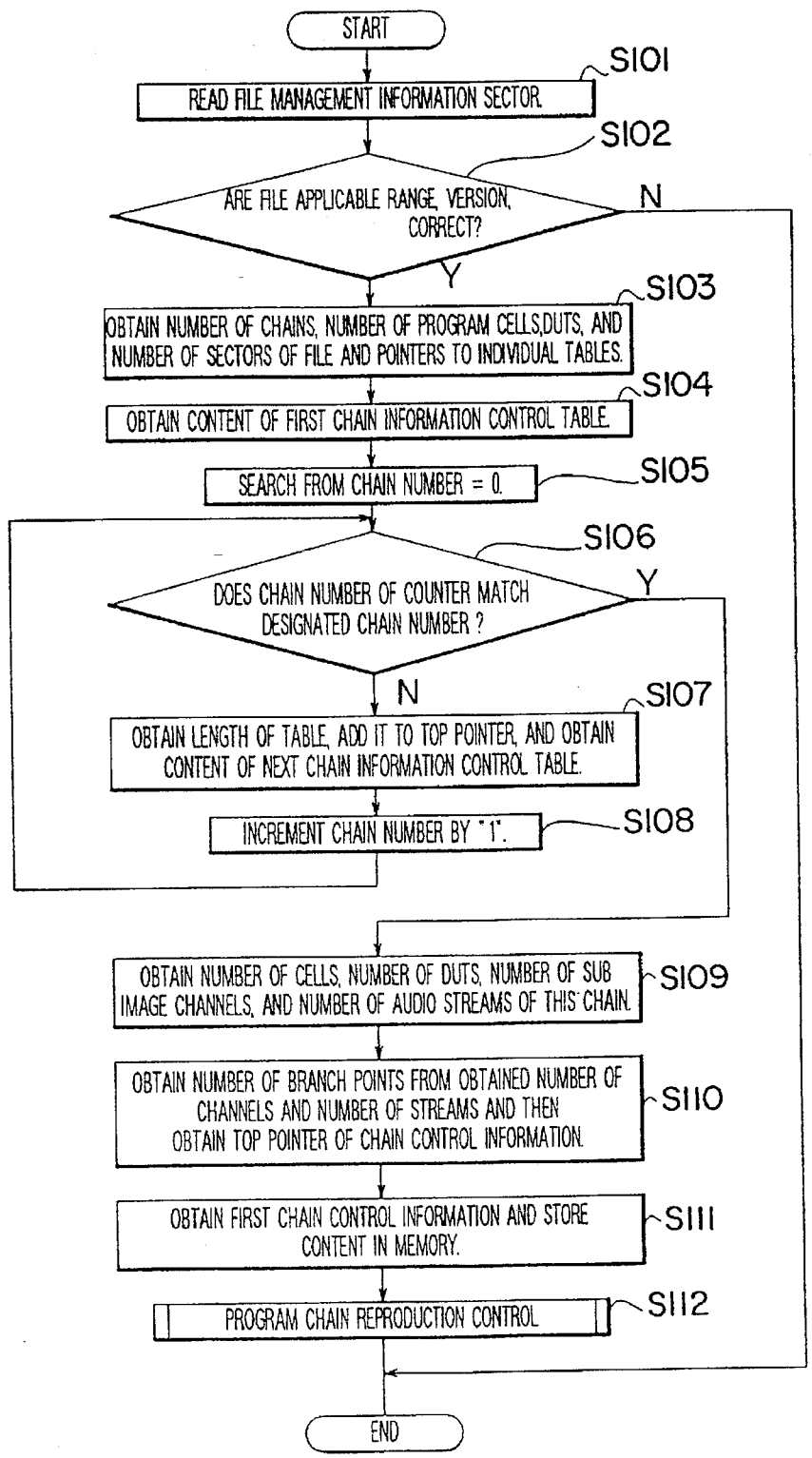
FIG. 21 is a flow chart showing a program chain selecting process.

Next, with reference to FIG. 21, a process for selecting a program chain will be described.

The reproducing apparatus can reproduce any program chain selected by the user from a plurality of program chains that are present in a file.

The reproducing apparatus obtains a required file and then reads the file management table 5 from the file (at step 101). Thereafter, the reproducing apparatus obtains the number of program chains in the file, the number of program cells in the file, the number of DUTs in the file, the number of sectors in the file, and the pointers that represent the top of each table (at step 103). Next, the reproducing apparatus obtains the content of the first chain information table corresponding to the obtained pointers (at step 104) and resets the counter value that represents the chain number to "0" (at step 105).

After that, the reproducing apparatus determines whether or not the chain number represented by the counter matches a chain number designated by the user (at step 106). When these number do not match, with a pointer that is obtained by adding the length of the table written to the chain information table to the top pointer, the reproducing apparatus obtains the content of the next chain information table (at step 107). Thereafter, the reproducing apparatus increments the chain number by "1" (at step 108) and determines whether or not the chain number of the counter matches the chain number designated by the user. The reproducing apparatus repeats steps 6 to 8 until the chain number represented by the counter matches the chain number designated by the user.

When the chain number represented by the counter matches the chain number designated by the user, the reproducing apparatus obtains the number of program cells that compose the program chain, the number of DUTs, the number of sub video channels, the number of audio streams, and so forth from the chain information table (at step 109). Thereafter, the reproducing apparatus obtains the number of branch points (NBP) in the chain information table and the top pointer of the cain control information (SCINFO) from the obtained information (at step 110). After that, the reproducing apparatus obtains the top chain control information (SCINFO) from the obtained top pointer (at step 111) and starts the reproduction control of the program chain corresponding to the chain control information (SCINFO) (at step 112).

The top positions of the file management table 5, the chain information table 6, the cell information table 6, the cell information table 7, the DAT 8, and the DUT 9 in the file shown in FIG. 15 are defined by the relative distance (the number of sectors) from the top of the file. In the following description, the number of sectors of the file management table 5 is represented by a. The number of sectors of all chain information tables 6 is represented by b. The number of sectors of all cell information tables is represented by c. The number of sectors of all DATs is represented by d. Thus, the top position of the file management table is represented by 0. The position of the top chain information table is represented by a. The position of the top cell information table is represented by a+b. The position of the top DAT is represented by a+b+c. The position of the top DUT is represented by a+b+c+d.

Figures 22, 23A, 23B, 23C:
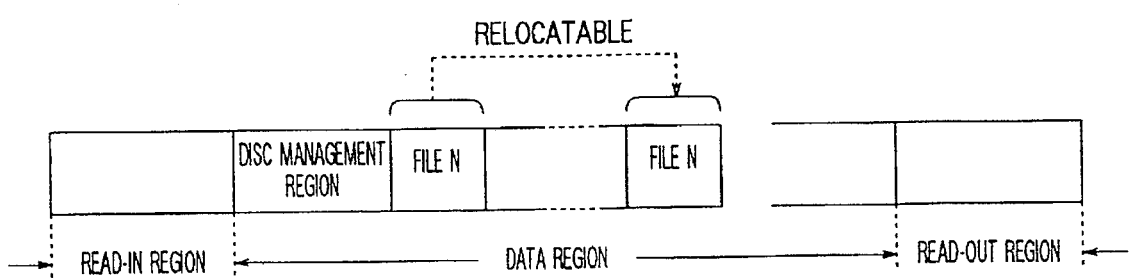
FIG. 22 is a schematic diagram showing an example of file relocation.
FIGS. 23A–23C illustrate tables showing branch information of three program chains.

Because the position in the file is represented by the relative distance (the number of sectors) from the top of the file, as shown in FIG. 22, when the file is relocated to another position of the data region, it is not necessary to change the value that represents the position.

In the file structure of this optical disc, a plurality of program chains can share the same program cells.

As shown in FIG. 18, in the chain information table, the number of branch points (NBP) that represents the number of program cells shared with another program chain and branch information (BINFO) that is the program cell number are written. FIGS. 23A–23C and 24A–24C show examples of the branch information (BINFO) and chain control information (SCINFO) in the case that program chains A, B, and C share program cells. In the chain control information (SCINFO), program cell numbers are written in the order of reproduction thereof. The reproducing apparatus successively selects and reproduces program cells corresponding to the chain control information (SCINFO). Thus, the program chains A, B, and C are reproduced corresponding to the process shown in FIGS. 25A–25C. In FIGS. 25A–24C, (0) to (8) represent program cell numbers and reproducing regions thereof.

Next, the operation in the case that a program chain is switched while one of program chains A, B, and C is being reproduced will be described.

1) When the program chain A is switched to the program chain B while the program cell 1 of the program chain A is being reproduced, the program chain B is reproduced from the first program cell 5.
2) When the program chain A is switched to the program chain C while the program cell 1 of the program chain A is being reproduced, the program chain C is reproduced from the first program cell 7.
3) When the program chain A is switched to the program chain B after the program cell 1 of the program chain A has been reproduced, the program chain B is reproduced from the next program cell 2. This is because the program chain B has the program cell 1 that is shared with the program chain A. To prevent the same program cell from being redundantly reproduced, the program chain B is reproduced from the next program cell 2.
4) When the program chain A is switched to the program chain C after the program cell 1 of the program chain A has been reproduced, the program chain C is reproduced from the first program cell 7.
5) When the program chain A is switched to the program chain B after the program cell 2 of the program chain A has been reproduced, the program chain B is reproduced from the program cell 6. The reason is the same as 3) above.
6) When the program chain A is switched to the program chain C after the program cell 2 of the program chain C has been reproduced, the program chain C is reproduced from the first program cell 7.
7) When the program chain A is switched to the program chain B after the program cell 3 of the program chain A has been reproduced, the program chain B is reproduced from the program cell 6.
8) When the program chain A is switched to the program chain C after the program cell 3 of the program chain A has been reproduced, the program chain C is reproduced from the program cell 8. This is because the program chain C has the program cell 3 that is shared with the program chain A. To prevent the same program cell from being redundantly reproduced, the program chain C is reproduced from the program cell 8.

When a first program chain is switched to a second program chain that shares program cells with the first program chain, after the shared program cells have been reproduced, the next program chain is reproduced.

Next, a process for controlling the reproduction of a program chain will be described.

As shown in FIG. 18, in the chain information table, the chain control information (SCINFO) is successively recorded in the order of the reproduction of the program cells. Thus, by reading the chain control information, the program cells can be successively reproduced (namely, the program chain can be reproduced).

As shown in FIGS. 18 and 26, the chain control information (SCINFO) includes a two-bit reproduction control area 61. The reproducing apparatus can recognize the content of the control of program cells that are successively reproduced corresponding to the reproduction control information.

The content of the reproduction control information is:
00: Successively reproduces the next program cell without waiting after a program cell is reproduced (presence of continuity of programs).
01: Successively reproduces the next program cell without waiting after a program cell is reproduced (absence of continuity of programs).
10: Reproduces a program cell with waiting time (PWAIT) designated by cell information table after another program cell is reproduced.

11: Stops the reproducing operation, after a program cell is reproduced.

Next, a real example of the successive reproduction control of program cells corresponding to the reproduction control information will be described.

FIG. 26 shows an example of the chain control information (SCINFO). In this example, a program chain is composed of five program cells. The angle modes of the program cells are "00". A multi-angle reproduction is not designated. In the multi-angle reproduction, the user can select one of program cells that can be reproduced in the same time on the same time axis. For example, in the case of a baseball program on TV, the user can select one of the two images which have been photographed and received by cameras on the first base side and the second base side.

Figure 27:
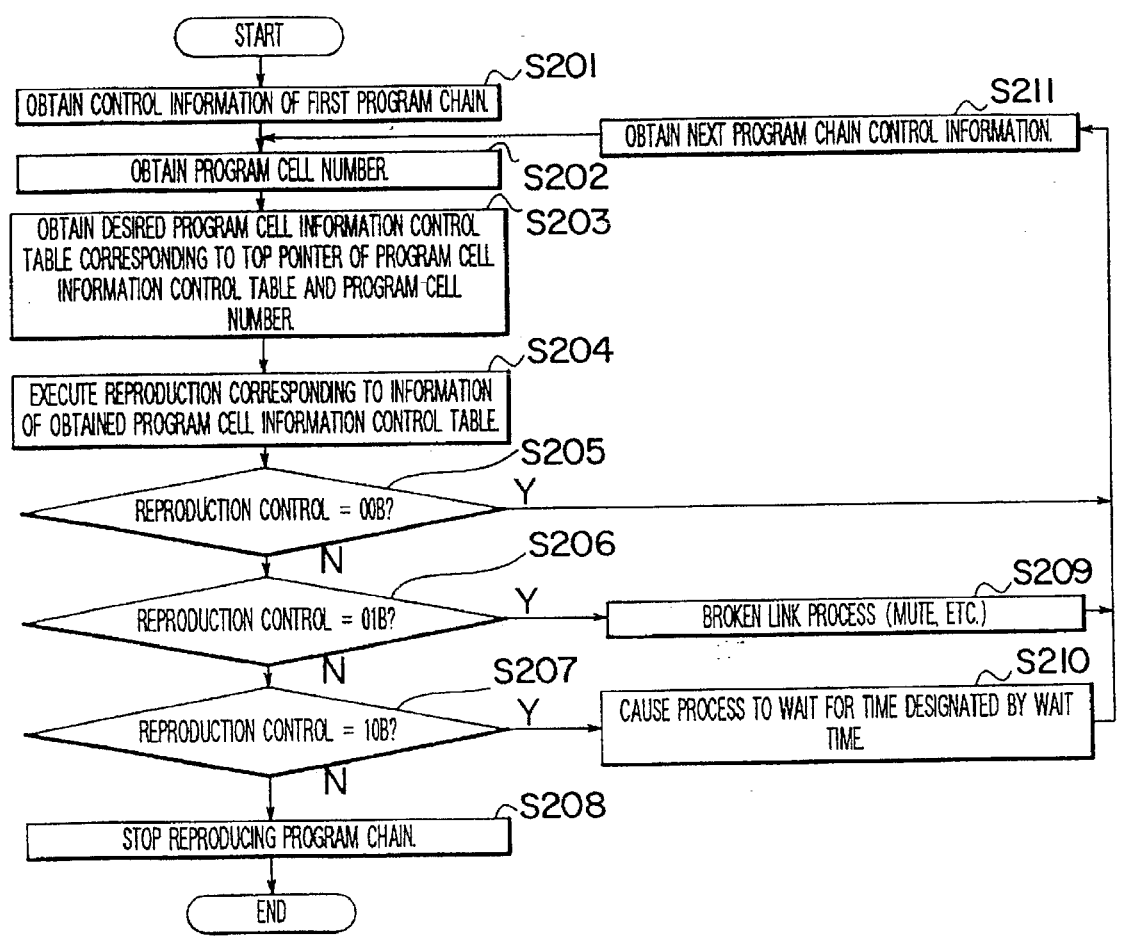
FIG. 27 is a flow chart showing a successive reproducing process of program cells.

Next, with reference to a flow chart of FIG. 27, a process for controlling successive reproduction of program cells will be described with no multi-angle (angle mode=00B).

The reproducing apparatus obtains the first control information (SCINFO) from the chain information table (at step 201) and reads the first program cell number therefrom (at step 202). Thereafter, the reproducing apparatus reads the top pointer of the cell information table from the file management table and obtains a desired cell information table corresponding to the top pointer and the program cell number (at step 203). Next, the reproducing apparatus reproduces program cells corresponding to the content of the obtained cell information table (at step 204).

At this point, the reproducing apparatus reads the information of the reproduction control area of the chain control information and controls the successive reproduction of the program cells corresponding to the reproduction control information.

When the reproduction control information is "00" (at step 205), after the reproducing apparatus has reproduced the program cell, it obtains the next chain control information (SCINFO) (at step 211) and then starts reproducing the next program cell.

When the reproduction control information is "01" (at step 206), the reproducing apparatus executes a broken link process such as mute just before it completes reproducing the program cell (at step 209). After the reproducing apparatus has reproduced the program cell, it obtains the next program chain control information (SCINFO) and then starts reproducing the next program cell.

When the reproduction control information is "10" (at step 207), after the reproducing apparatus has reproduced the program cell, it performs a wait process for time (PWAIT) designated by the cell information table (at step 210). After the wait time elapsed, the reproducing apparatus obtains the next chain control information (SCINFO) and starts reproducing the next program cell.

When the reproduction control information is "11", after the reproducing apparatus has reproduced the program cell, it stops reproducing the program chain (at step 208).

Figures 28, 29:
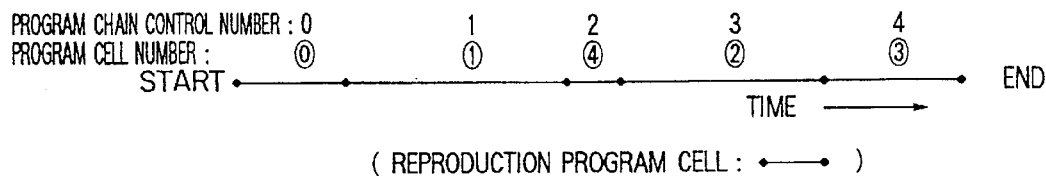
FIG. 28 is a schematic diagram showing a real example of a successive reproducing process of program cells.
FIG. 29 is a table showing an example of control information of program chains including multiple angles.

The real process of the reproduction control for the chain control information shown in FIG. 26 will be described as follows. FIG. 28 shows the process of the reproduction control.

Chain control information number 0:S1→S2 (obtained cell number 0)→S3→S4 (reproduced cell number)→S5→S11

Chain control information number 1:→S2 (obtained cell number 1)→S3→S4 (reproduced cell number 1)→S5→S6→S9 →S11

Chain control information number 2:→S2 (obtained cell number 4)→S3→S4 (reproduced cell number 4)→S5→S11

Chain control information number 3:→S2 (obtained cell number 2)→S3→S4 (reproduced cell number 2)→S5→S6→S7 →S10 (wait process)→S11

Chain control information number 4:→S2 (obtained cell number 3)→S3→S4 (reproduced cell number 3)→S5→S6→S7→S8→end Next, a process for multi-angle reproduction of program cells will be described.

As shown in FIGS. 29 and 18, in the chain control information of the chain information table, 2-bit angle mode information 71 and 4-bit angle number 42 are recorded. The content of the angle mode information 71 is as follows. The angle block is a group of some program cells that are selectively reproduced in the same time on the same time axis.

00: No angle block
10: Start/continuance of angle block
11: End of angle block.

Angle numbers 72 are successively assigned to program cells that compose an angle block. When the user selects an angle number, the program cell corresponding to the angle number is reproduced.

Figure 30:
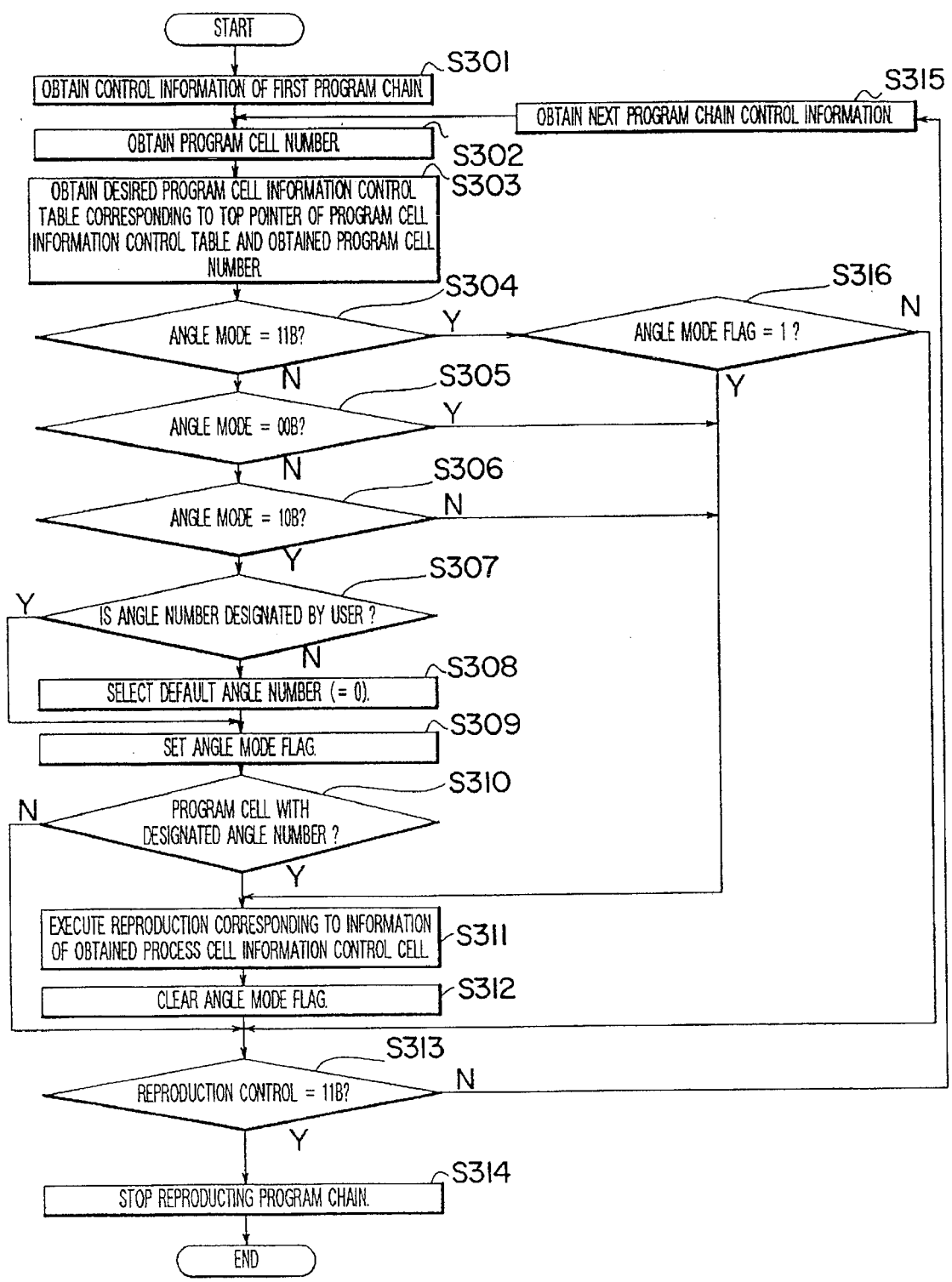
FIG. 30 is a flow chart showing a reproduction control process of multiple angles.

Next, the process for the multi-angle reproduction will be described. FIG. 30 is a flow chart showing the process for the multi-angle reproduction control.

The reproducing apparatus obtains the first chain control information (SCINFO) from the chain information table and reads the first program cell number therefrom (at step 302). Thereafter, the reproducing apparatus reads the top pointer of the cell information table from the file management table and obtains a desired cell information table corresponding to the top pointer and the program cell number (at step 303). The reproducing apparatus reads the angle mode information 71 of the first chain control information and executes the multi-angle reproduction control corresponding to the information in the following manner.

When the angle mode information is "10" (start/continuance of angle block) (at step 306), the reproducing apparatus determines whether or not the user has designated an angle number (at step 307). When an angle number has not been designated, the reproducing apparatus selects a default angle number (0) (at step 308) and sets the angle mode flag (at step 309). When an angle number has been designated, the reproducing apparatus just sets the angle mode flag (at step 309).

Thereafter, the reproducing apparatus determines whether or not the present program cell is a program cell with an angle number designated by the user (at step 310). When the determined result is YES, the reproducing apparatus obtains a corresponding cell information table and executes the reproduction of the program cell corresponding to the content of the cell information table (at step 311). Thereafter, the reproducing apparatus resets the angle mode flag (at step 312). When the determined result is "NO", the reproducing apparatus does not reproduce the present program cell. Thus, the reproducing apparatus keeps the angle mode flag in the set state.

Next, the reproducing apparatus reads the information of the reproduction control area 61. When the information is not "11" (stops reproducing the program chain) (at step 313), the reproducing apparatus obtains the next chain control information from the chain information table (at step 315) and repeats the same process at step 2.

When the angle mode information 71 at step 4 is "11" (end of the angle block), the reproducing apparatus determines whether or not the angle mode flag has been set (at step 316). When the angle mode flag has been reset, the reproducing apparatus obtains the next chain control information through step 13 (at step 315). Alternatively, the reproducing apparatus terminates the process for reproducing the program chain (at step 314).

Figure 31:
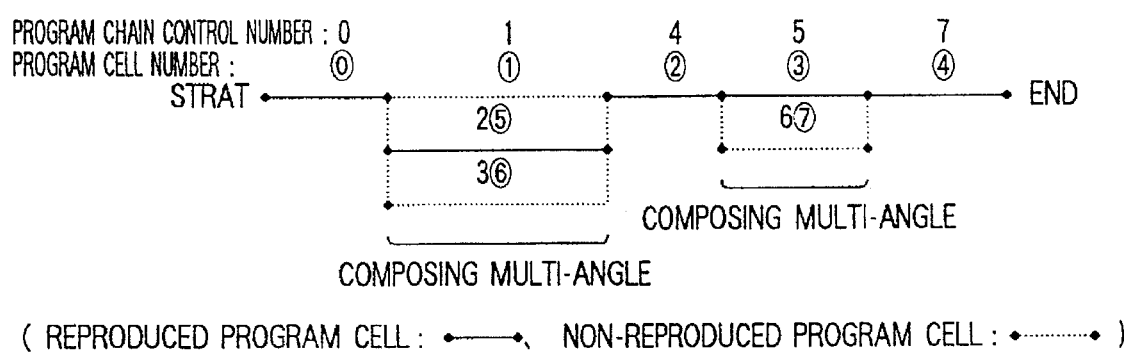
FIG. 31 is a schematic diagram showing a real example of a reproducing process of multiple angles.

Thus, the multi-angle reproduction control is executed corresponding to the chain control information shown in FIG. 29 as follows. FIG. 31 shows the process for the multi-angle reproduction control. In the following description, it is assumed that the angle number designated by the user is "1".

Chain control information number 0:S1→S2 (obtained cell number 0)→S3→S4→S5→S11 (reproduced cell number 0)→S12→S13→S15

Chain control information number 1:→S2 (obtained cell number 1)→S3→S4→S5→S6→S7→S9→S10→S13→S15

Chain control information number 2:→S2 (obtained cell number 5)→S3→S4→S5→S6→S7→S9→S10→S11 (reproduced cell number 5)→S12→S13→S15

Chain control information number 3:→S2 (obtained cell number 6)→S3→S4→S16→S13→S15

Chain control information number 4:→S2 (obtained cell number 2)→S3→S4→S5→S11 (reproduced cell number 2)→S12→S13→S15

Chain control information number 5:→S2 (obtained cell number 3)→S3→S4→S5→S6→S7→S8→S9→S10→S11 (reproduced cell number 3)→S12→S13→S15

Chain control information number 6:→S2 (obtained cell number 7)→S3→S4→S16→S13→S15

Chain control information number 7:→S2 (obtained cell number 4)→S3→S4→S5→S6→S11 (reproduced cell number 4)→S12→S13→S14→end Next, specific code added corresponding to an application type of a program chain of this disc will be described.

As shown in FIG. 17, in the chain information table, 4-bit type information 74 and 8-bit specific code 73 are recorded. The 4-bit type information 74 represents an application type of a program chain. The 8-bit specific code 73 represents detail description of the application type. The specific code 73 represents detailed content, and the detailed content corresponding to the code is defined uniquely to each of the application type. For example, as an application of a program chain, an orchestral music program and an instrument are considered. In the case of an orchestral music program, the specific code represents the language type of the superimposed text. In the case of the instrument, the specific code represents the type of the instrument. Thus, without need to extend the specific code, with the specific code having a fixed length, detailed contents of many types can be defined.

Next, a process for displaying a menu of the disc will be described.

Figure 32:
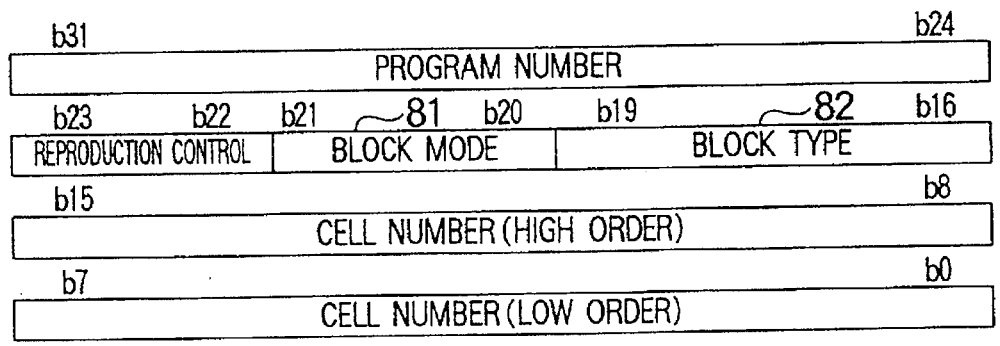
FIG. 32 is a schematic diagram showing a construction of chain control information in a chain information table that composes a menu screen.

FIG. 32 is a schematic diagram showing the structure of chain control information (SCINFO) in the chain information table that composes a menu screen. FIG. 33 is a table and a schematic diagram showing the structure of a cell information table composing a menu screen.

As shown in FIG. 32, the chain control information (SCINFO) of the chain information table includes 2-bit block mode information 81 and 4-bit block type 82 that represents the type of a block. The block mode information 81 represents the correlation among a plurality of program cells. In other words, when the block mode information 81 is "00", the program cell is not a cell that composes the block. When the block mode information 81 is "01", the program cell is a cell at the top of the block. When the block mode information 81 is "10", the program cell is a cell except the top cell and the end cell in the block. When the block mode information 81 is "11", this program cell is a cell at the end of the block. When the block type 82 is "0000", this program cell is not a block. When the block type 82 is "0001", this program cell is an angle block. When the block type 82 is "0010", this program cell is a menu block.

As shown in FIG. 33, in the cell information table, type information 83 and specific code 84 are written. The type information represents the type of a program cell. As the types of program cells, there are movie, orchestra, and various menus. As menu types, there are file selecting menu, sequence (program chain) selecting menu, audio stream selecting menu, sub video channel selecting menu, program selecting menu, angle selecting menu, and so forth. When the type of the program cell is the menu, the specific code 84 represents the language type.

Figure 34:
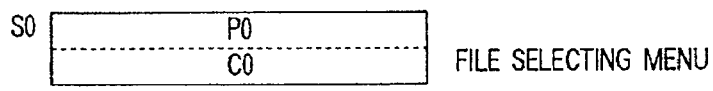
FIG. 34 is a schematic diagram showing a structure of a file selecting menu.

FIG. 34 is a schematic diagram showing a structure of a file selecting menu. As shown in FIG. 34, the file selecting menu is composed with the top file in the data region. In other words, this file is composed of at least one chain information table S0 including at least one cell information table C0. In FIG. 34, P0 represents a program composing a program chain. A program is composed of at least one cell information table.

Figure 35:
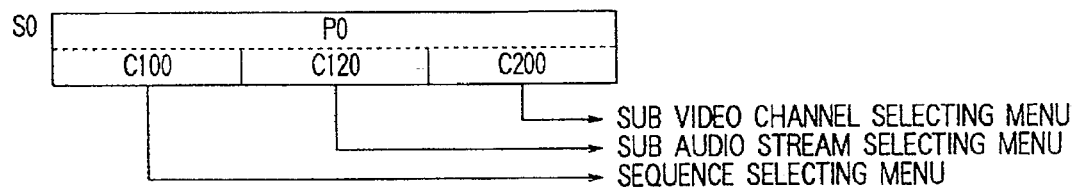
FIG. 35 is a schematic diagram showing a structure of a sequence (program chain) selecting menu.

FIG. 35 is a schematic diagram showing a structure of a sequence (program chain) selecting menu. As shown in FIG. 35, this menu is composed of chain information tables S0 at the top portions of individual files. In the chain information table, cell information tables C120 and C200 that compose the audio stream selecting menu and selecting video channel selecting menu can be added. In this case, a plurality of cell information tables that composes individual menus are correlated by the block mode information 81 in the chain information table. When one menu is composed of a plurality of screens (a plurality of cell information tables), each cell information is correlated by the block mode information 81.

Figure 36:
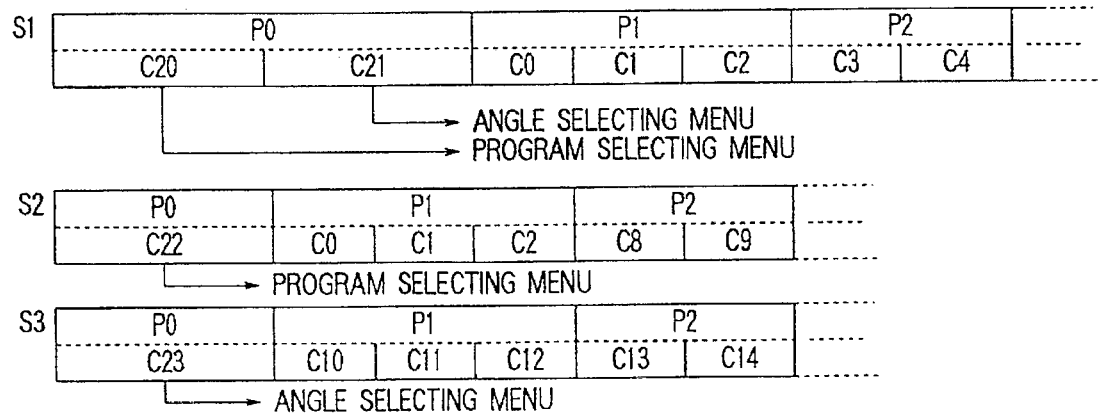
FIG. 36 is a schematic diagram showing a structure of another menu.

One chain information table can compose a menu and non-menu data by using the block mode information 81 and the block type 82. FIG. 36 is a schematic diagram in this case. In this example, the chain information table S1 includes two cell information tables C20 and C21 that compose the angle selecting menu and the program selecting menu. The cell information tables C20 and C21 are placed only at the top portion of the chain information table S1. The next chain information table S2 includes one cell information table C22 that composes a low order program selecting menu of the program selecting menu. The cell information table C22 is placed only at the top portion of the chain information table S2. The chain information table S3 includes one cell information table C23 that composes a low order angle selecting menu of the angle selecting menu. The cell information table C23 is placed at the top portion of the chain information table S3.

Next, a reproducing apparatus that accomplishes the menu display of the disc will be described.

Figure 37:
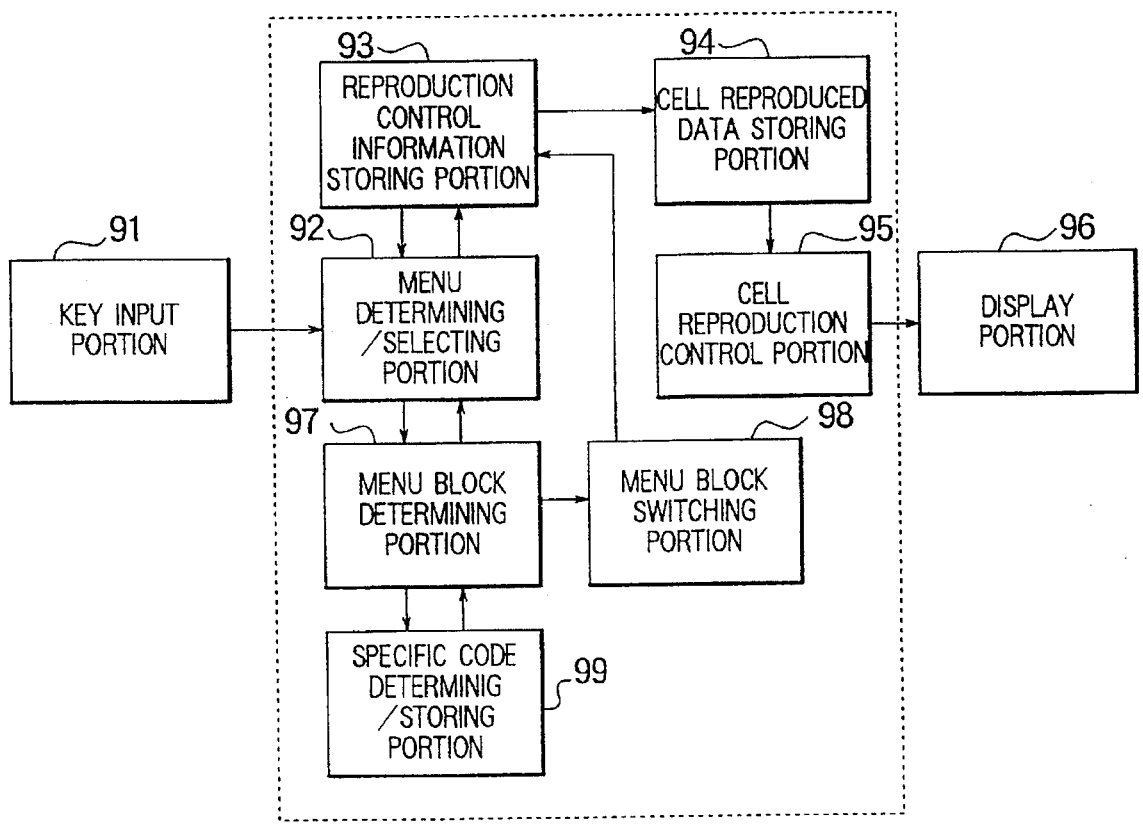
FIG. 37 is a block diagram showing a structure of a function for displaying a menu.

FIG. 37 is a block diagram showing the construction of the function that accomplishes the menu display. In FIG. 37, reference numeral 91 is a key input portion that designates a selection item on the menu screen and a language type. Reference numeral 92 is a menu determining/selecting portion that determines a cell information table that composes a menu screen corresponding to the type information 83 recorded in the cell information table and recognizes an item number selected on the menu screen. Reference numeral 93 is a reproduction control information storing portion that stores reproduction control information recorded in a chain information table including the cell information table that composes the menu screen. Reference numeral 94 is a cell reproduced data storing portion that stores at least one data unit as cell reproduced data corresponding to the cell information table that composes the menu screen. Reference numeral 95 is a cell reproduction control portion that controls the reproduction of cell reproduced data stored in the cell reproduced data storing portion 94. Reference numeral 96 is a display portion that displays the menu screen. Reference numeral 97 is a menu block determining portion that recognizes the correlation among a plurality of cell information tables that composes the menu screen corresponding to the block mode information 81 in the chain information table. Reference numeral 98 is a menu block switching portion that switches the present menu screen to the next menu screen after an item has been selected on the menu screen that is being reproduced when the menu block determining portion 97 has recognized the correlation between the present menu screen and the next reproducing menu screen. Reference numeral 99 is a specific code determining/storing portion that stores the specific code 73 of the cell information table that composes the menu screen and determines whether or not the language type of the menu screen matches the predetermined language type.

Figure 38:
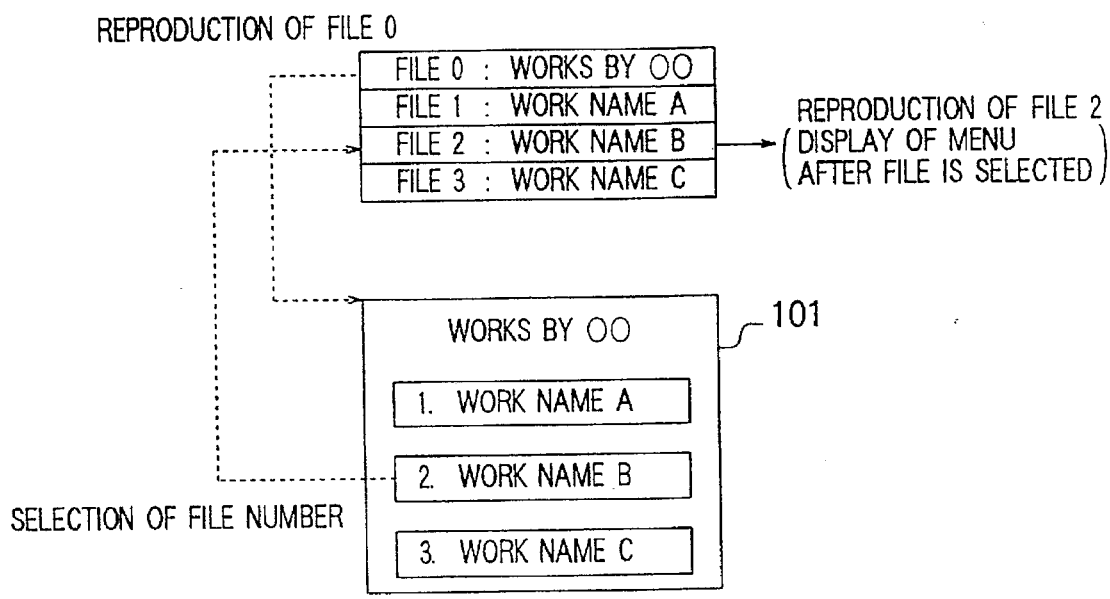
FIG. 38 is a schematic diagram showing a file selecting process.
Figure 40:
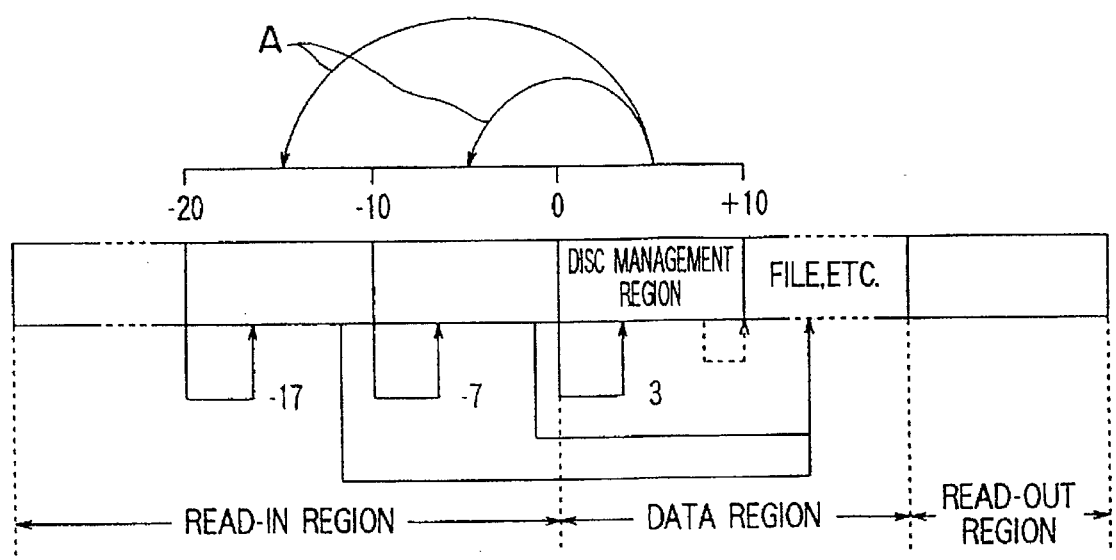
FIG. 40 is a schematic diagram showing multiplexedly recorded spare management information of a related art reference.
Figure 41:
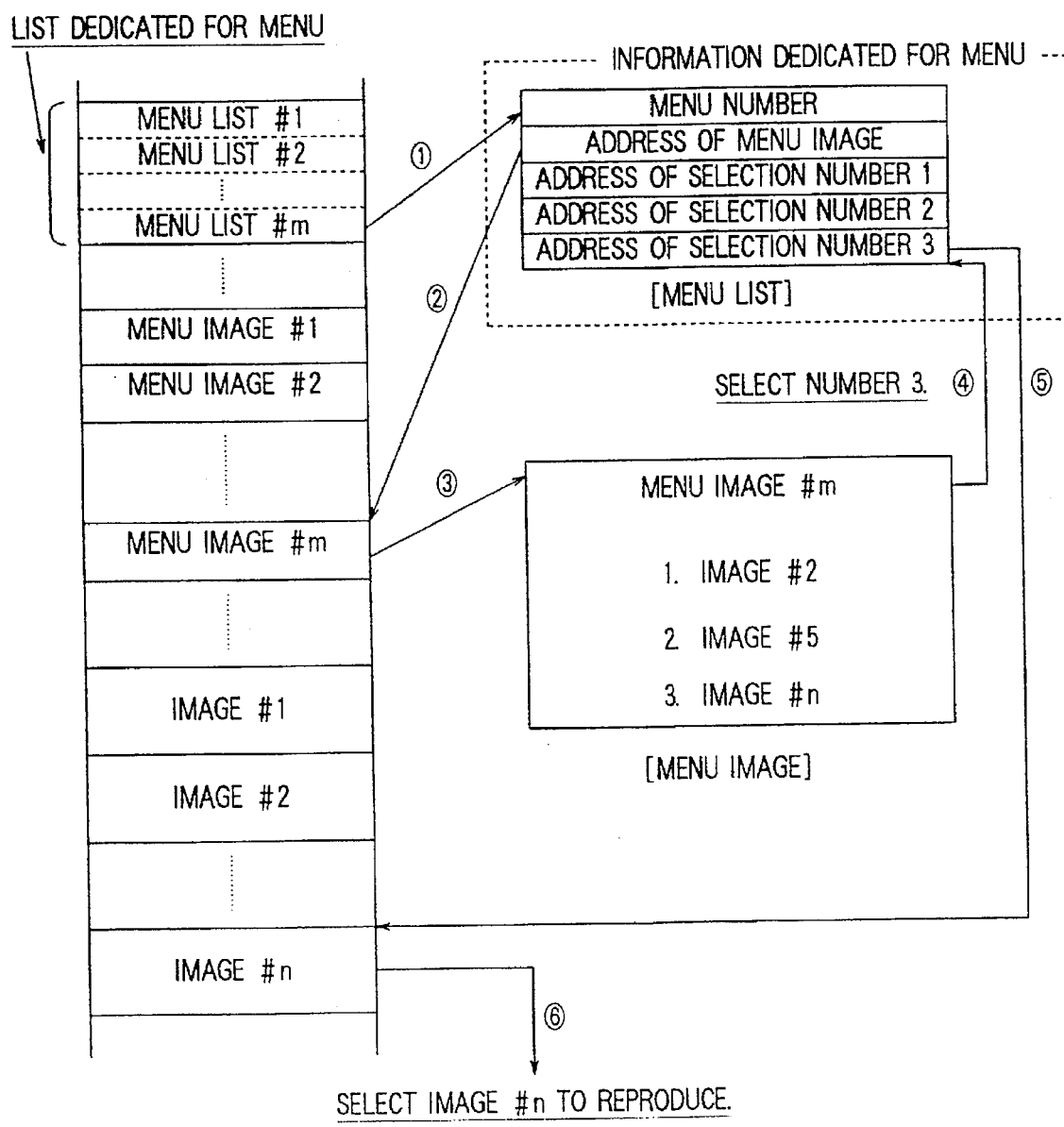
FIG. 41 is a schematic diagram showing a menu composing process of a related art reference.

Next, the operation of the menu display of the disc will be described. FIG. 38 is a schematic diagram showing a process for selecting a file.

The reproducing apparatus obtains the chain information table at the top of the top file (file 0) in the data region and stores the obtained reproduction control information of the chain information table in the reproduction control information storing portion 93. Next, the reproducing apparatus obtains the first cell information table corresponding to the top chain control information. The menu determining/selecting portion 92 reads the program cell type information 83 included in the cell information table and determines whether or not the program cell type is a menu. When the program cell type is a menu, the cell reproduction control portion 95 reproduces the program cell. The display portion 96 displays a file selecting menu screen 101 as shown in FIG. 38. The menu screen 101 displays each file number along with the corresponding file name (work name). When the user selects any file number with the key input portion 91, the menu determining/selecting portion 92 recognizes the selected file number and obtains the top chain information table in the file corresponding to the file number. The reproduction control information storing portion 93 stores the reproduction control information of the chain information table. Thereafter, the reproducing apparatus obtains the first cell information table corresponding to the top chain control information. After that, the menu determining/selecting portion 92 reads the program cell type information 83 included in the cell information table. When the program cell type is a menu, the cell reproduction control portion 95 reproduces the program cell and displays the next menu screen on the display portion 96.

The menu block determining portion 97 reads the block mode information 81 and the block type 82 from the chain information table and determines whether or not each cell information in the chain information table has correlation as a menu block. When the present menu screen and the next menu screen correlate, the menu block switching portion 98 switches the present menu screen to the next menu screen after an item of the present menu screen has been selected. In such a manner, all the menus can be successively displayed up to the last cell of the menu block.

In addition, on the disc, a plurality of menu screens with the same content but different languages are recorded as one menu block. The language type of the menu is represented by the specific code 84 in the cell information table. FIG. 39 is a schematic diagram showing an example of a cell information table group that composes a plurality of menu screens with different languages. In this case, when the user designates a language type, the specific code determining/storing portion 99 selects only a program cell that composes the menu corresponding to the language type from the menu group that composes one menu block and successively reproduces it.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. The recording medium on which data is recorded as a file, the file comprising:

a data unit region containing a data unit representing a group of a plurality of types of data that are synchronously reproduced;

a cell information region containing at least one cell information table containing cell information defining a program cell by linking data defining at least one data unit recorded in said data unit region;

a chain information region containing chain information defining at least one program chain composed by linking at least one of said program cells based on said cell information table recorded in said cell information region; and at least one cell information menu table that contains information used to compose a menu screen on which any data item to be displayed is selected, wherein said cell information table includes identifying information indicating that said cell information menu table used to compose said menu screen.

2. The recording medium as set forth in claim 1, wherein said chain information that composes said program chain and said cell information menu table that composes said menu screen define a cell information group as one block of information in said file.

3. The recording medium as set forth in claim 1, wherein said cell information menu table that composes said menu screen further includes language type information that represents a language of characters displayed on said menu screen.

* * * * *

UNITED STATES PATENT AND TRADEMARK OFFICE
CERTIFICATE OF CORRECTION

PATENT NO. : 5,642,346

DATED : June 24, 1997

INVENTOR(S) : Kazuhiko TAIRA, et al.

It is certified that error appears in the above-identified patent and that said Letters Patent is hereby corrected as shown below:

On the title page, item

"[54] RECORDING MEDIUM AND REPRODUCING APPARATUS THEREOF" to

--[54] RECORDING MEDIUM--.

Column 2, line 21, after "to" insert --record the same data--.

line 21, after "fashion" insert --,--.

line 22, delete "record the same data."

Column 4, line 26, after "user" insert --is--.

line 60, after "information" insert --written to a read-in region--.

line 60, delete "written to a read-in".

line 61, delete "region".

Column 9, line 62, delete "24C" insert --25C--.

Signed and Sealed this

Tenth Day of March, 1998

Attest:

BRUCE LEHMAN

*Attesting Officer*    *Commissioner of Patents and Trademarks*